(12) United States Patent
Bradshaw et al.

(10) Patent No.: US 12,299,171 B2
(45) Date of Patent: May 13, 2025

(54) COLLATING ANONYMIZED DATA

(71) Applicant: FITFILE Group Limited, Surrey (GB)

(72) Inventors: Jonathan Marsden Bradshaw, Surrey (GB); Philip-Moritz Russmeyer, Surrey (GB)

(73) Assignee: FITFILE Group Limited, Surrey (GB)

( * ) Notice: Subject to any disclaimer, the term of this patent is extended or adjusted under 35 U.S.C. 154(b) by 639 days.

(21) Appl. No.: 17/558,636

(22) Filed: Dec. 22, 2021

(65) Prior Publication Data

US 2022/0207182 A1    Jun. 30, 2022

(30) Foreign Application Priority Data

Dec. 22, 2020    (EP) ..................................... 20216505

(51) Int. Cl.
*G06F 21/62*    (2013.01)
*H04L 9/30*    (2006.01)
*H04L 9/40*    (2022.01)

(52) U.S. Cl.
CPC ........ *G06F 21/6254* (2013.01); *H04L 9/3066* (2013.01); *H04L 63/0435* (2013.01)

(58) Field of Classification Search
CPC .... G06F 21/60; G06F 21/602; G06F 21/6245; G06F 21/6254; G06F 21/6218; G06F 21/6236; G06F 21/62; G06F 21/6209; H04L 9/3218; H04L 9/008; H04L 9/3221; H04L 2209/42; H04L 63/042; H04L 63/04

See application file for complete search history.

(56) References Cited

U.S. PATENT DOCUMENTS

| 10,846,372 | B1* | 11/2020 | Jayachandran | ....... H04L 9/3239 |
| 2011/0087885 | A1* | 4/2011 | Lerner | .................. H04L 63/065 |
| | | | | 713/168 |
| 2011/0206200 | A1* | 8/2011 | Sovio | .................... H04L 9/3073 |
| | | | | 380/30 |
| 2015/0149208 | A1* | 5/2015 | Lynch | .................... G16H 10/60 |
| | | | | 705/3 |

(Continued)

OTHER PUBLICATIONS

European Search Report for corresponding EP application No. 20216505.6 dated May 26, 2021.

*Primary Examiner* — Tae K Kim
(74) *Attorney, Agent, or Firm* — Cooper Legal Group, LLC

(57) ABSTRACT

Method of providing anonymized data comprises: first server connected to first data source generates shared encryption key and receives, from networked location, first message comprising first encrypted identifier that it is unable to decrypt. The first server generates shared encryption key and generates, from the first data source, first dataset that may include data corresponding to the first encrypted identifier, and returns it to the networked location. To generate the first dataset, the first server obtains, from the first data source, set of at least one local unencrypted identifier. For each local unencrypted identifier, it verifies, using the shared encryption key, the first encrypted identifier against the local unencrypted identifier to obtain successful or failed verification. If the verification is successful, it obtains, from the first data source, first corresponding data that is associated with the local unencrypted identifier, wherein the first dataset comprises this first corresponding data.

11 Claims, 19 Drawing Sheets

(56) References Cited

U.S. PATENT DOCUMENTS

| | | | |
|---|---|---|---|
| 2015/0288665 A1* | 10/2015 | El Emam | H04L 9/008 |
| | | | 713/171 |
| 2016/0147945 A1* | 5/2016 | MacCarthy | H04W 12/02 |
| | | | 705/51 |
| 2017/0372096 A1* | 12/2017 | Yousfi | G06F 21/6254 |
| 2018/0198601 A1* | 7/2018 | Laine | H04L 9/3239 |
| 2018/0309574 A1* | 10/2018 | Lyubashevsky | H04L 9/3093 |
| 2020/0014691 A1* | 1/2020 | Ortiz | H04L 9/0894 |
| 2022/0004654 A1* | 1/2022 | Patel | G06F 21/602 |

\* cited by examiner

COLLATING ANONYMIZED DATA

CROSS REFERENCE TO RELATED APPLICATIONS

This application claims priority from European Patent Application No. 20 216 505.6, filed on Dec. 22, 2020, which is incorporated herein by reference.

BACKGROUND OF THE INVENTION

The present invention relates to an apparatus and method for providing anonymized data, collated from at least two data sources.

Large amounts of data exist that relate to individuals. A single person may be identified in hundreds of databases across the world, which store information about that person's health, movement, spending patterns, and other activities. Much of this data would be extremely useful for researchers, if it were possible to collate it.

However, ethical and legal restrictions mean that data held on individuals can only be shared in an anonymized form, where any data that can be used to identify an individual is removed. Thus, for example, a researcher may request information from a single data source and this can be anonymized and provided. However, this anonymized data cannot be collated with anonymized data from other sources, precisely because the individuals cannot be identified. Thus it is a very time-consuming and often impossible process to obtain data on an individual from more than one data source, meaning that opportunities for research are being missed.

It is known to use a single encryption system across a number of data sources, such that encrypted data from these sources may be combined and returned to a requesting entity. However, in such a system, a number of sources, plus potentially the requester, know the encryption keys, and therefore each source (or a third party gaining unauthorised access to a source) could decrypt the information provided by any other source. This is therefore not a secure method of sharing confidential data.

BRIEF SUMMARY OF THE INVENTION

According to a first aspect of the present invention, there is provided a method of providing anonymized data. According to a second aspect of the present invention, there is provided apparatus for providing anonymized data.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
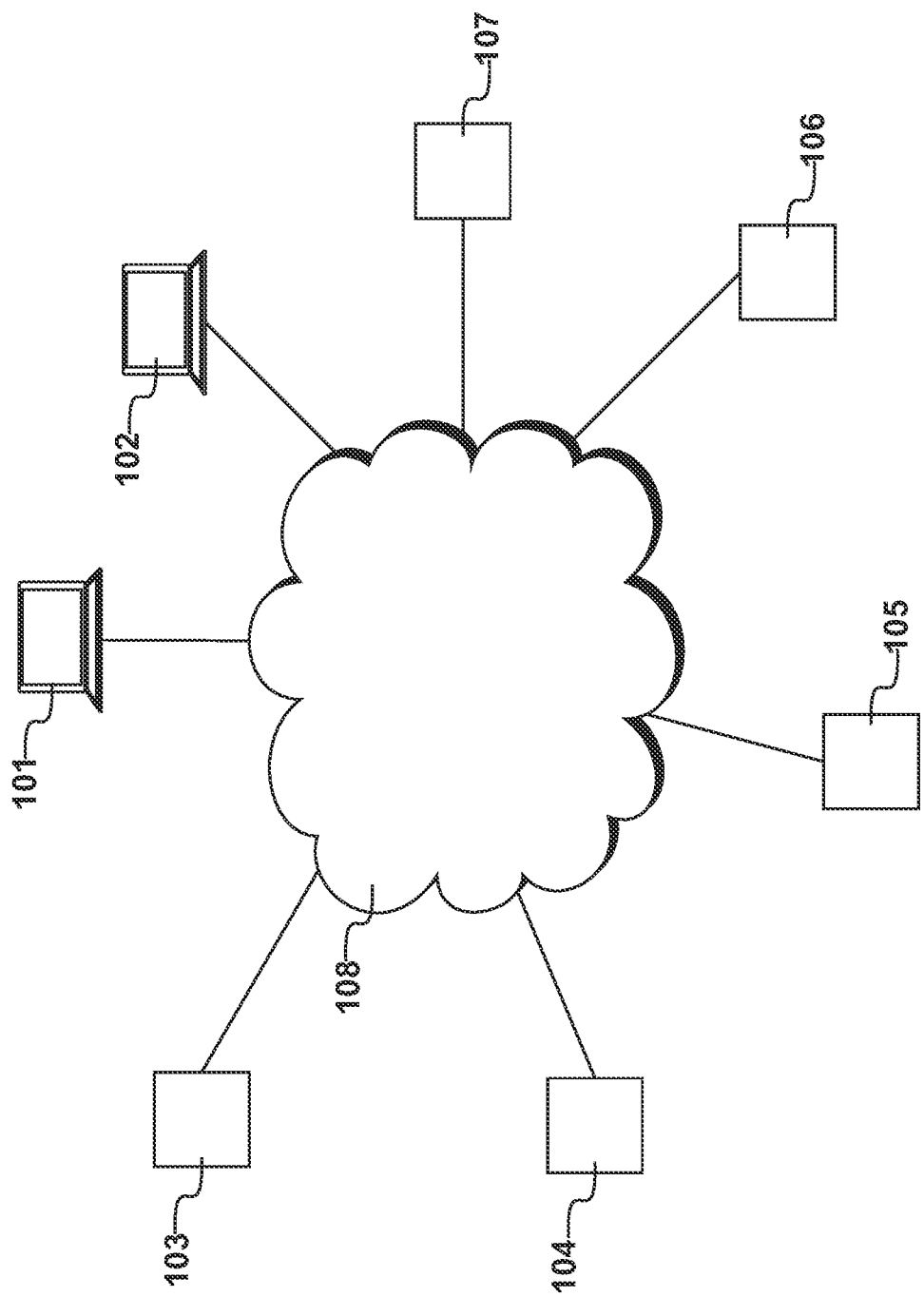
FIG. 1 illustrates a networked environment in which the invention may be embodied.

FIG. 1 illustrates a networked environment in which the invention may be embodied. Users 101 and 102 require access to data, and they submit requests to a coordination station 103. Coordination station 103 obtains anonymized data from data providers 104, 105, 106 and 107, collates it, and provides it back to a requesting user. Devices 101 to 107 are connected via the Internet 108. Networking infrastructure such as ISPs, gateways, etc. are not shown here, and any appropriate way of connecting to the Internet could be used. In other embodiments, a network other than the Internet could be used.

Data providers 104 to 107 do not communicate with each other, but only with coordination station 103. They do not directly share information, but only provide encrypted data to coordination station 103, which collates it. In this way, the personal data held on each data provider is never shared in an identifiable form, and if one of the data providers is insecure this will not affect the others.

FIG. 2

Figure 2:
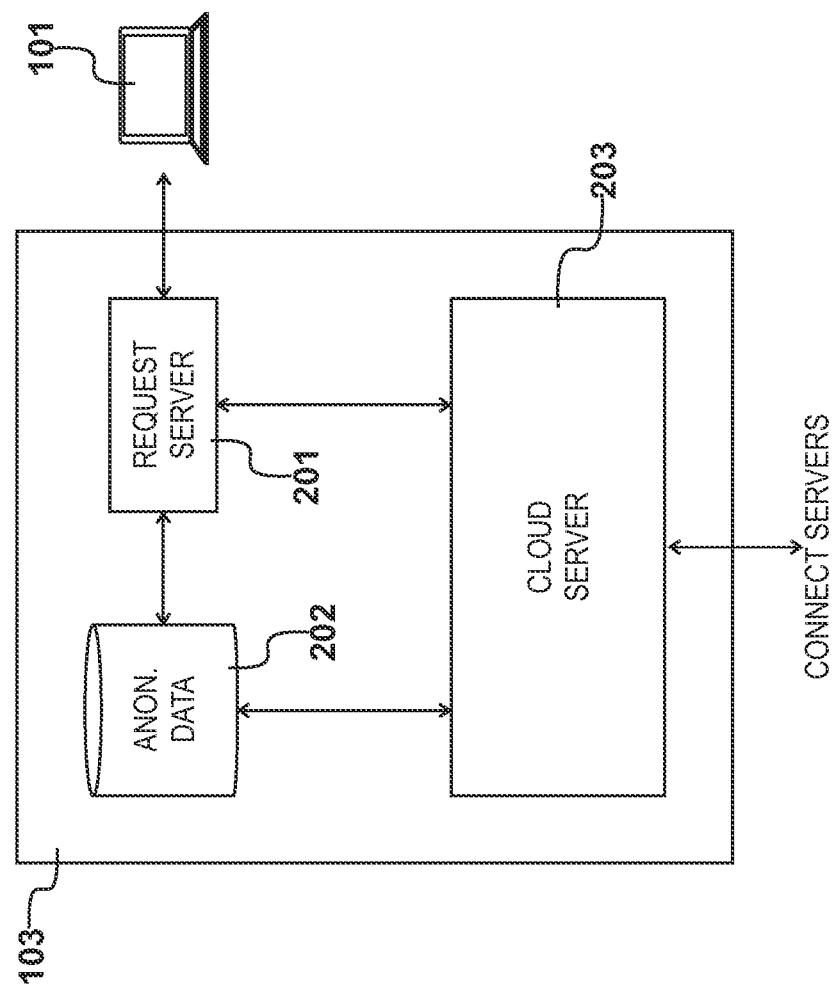
FIG. 2 is a schematic diagram of a coordination station shown in FIG. 1.

Coordination station 103 is shown schematically in FIG. 2. It includes a request server 201, which receives requests for anonymized data from users, such as user 101, and serves it from anonymized database 202. Cloud server 203 obtains and collates the anonymized data from the data providers via a connect server on each one, as will be further described with reference to FIG. 3. Request server 201 may be able to satisfy a user's request from data already present in database 202, or may need to issue a request to cloud server 203 to obtain new data.

Coordination station 103 may be implemented, for example, as a single large computer, or as two individual servers connected to a database. Additionally, each of request server 201 and cloud server 203 may be virtual servers, running for example on a single computing system or on a distributed computing system. Any suitable computing architecture can be used. Thus, references in the description and claims to a processor, a memory or a storage should be taken to mean either a single suitable device or a plurality of suitable devices, and references to steps being carried out by a processor should not be taken to mean that they are carried out by a single CPU.

As used herein, the term "server" means any piece of computing hardware or software that is capable of sending, receiving, or responding to requests from other pieces of hardware or software. With the above caveat, each of request server 201 and cloud server 203 includes a processor, a memory and at least one network interface (for communication with users in the case of the request server, and for communication with the connect servers in the case of the cloud server). Further network interfaces may also be required for communication between request server 201 and cloud server 203, depending on the implementation of coordination station 103.

FIG. 3

Figure 3:
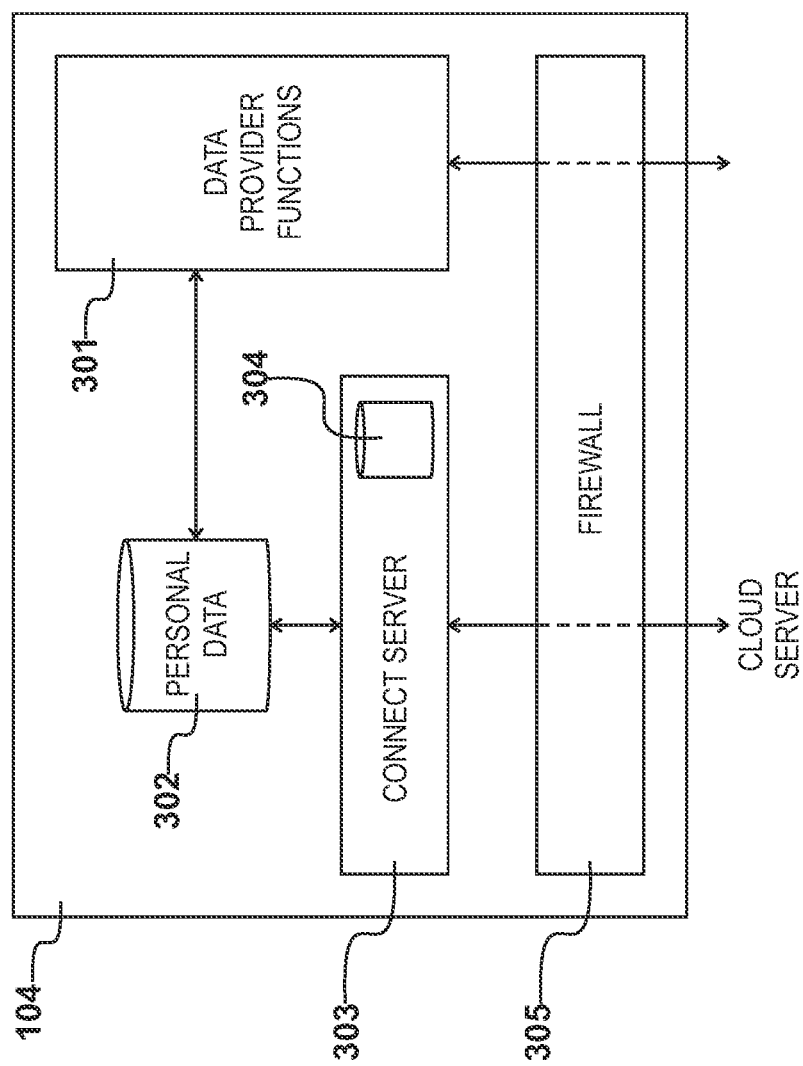
FIG. 3 is a schematic diagram of a data provider shown in FIG. 1.

Data provider 104 is shown schematically in FIG. 3. Each of data providers 104 to 107 is a different type of computing system, hosted by a different entity with differing requirements and functionality. For example, one data provider may be a small research organisation that hosts the results of a small number of studies, whereas another data provider may be a large health service that holds data on millions of people. Yet another data provider may be the administrator of a supermarket loyalty card system, which holds an enormous amount of data on several thousand people.

Thus, considering data provider 104, its main functions are summarised as data provider functions 301, which create and maintain personal data in database 302. These functions will not be described further herein, as the creation of personal data does not form part of the invention. However, they could involve receiving data via manual input, receiving data from connected computers that form part of the data provider, automatically processing data to generate further data, and so on.

Connect server 303 resides at data provider 104, with its own caching database 304. Connect server 303 may be a separate computing system, or may be a virtual server running on existing infrastructure in data provider 104. Similarly to coordination station 103, any suitable architecture may be used, and references to a processor, memory and storage include the possibility that these functionalities are shared across more than one device. In particular, references to steps being carried out by a processor should not be taken to mean that they are carried out by a single CPU.

With the above caveat, connect server 303 includes a processor, a memory and at least one network interface for communication with cloud server 203. Because data provider 104 hosts database 302 of personal data, it is required by ethical and legal considerations to ensure that this personal data is not compromised, which functionality is provided by firewall 305. Data provider functions 301 and connect server 303 can obtain personal data freely from personal database 302. However, any data that leaves data provider 104, via firewall 305, must be in an anonymized form, with all personal identifying data removed.

Personal identifying data is generally considered to be anything that can be used to identify an individual. Examples are ID numbers, names, addresses, email addresses, phone numbers, and so on. However, any non-identifying data may generally be freely shared as long as it cannot be used to identify an individual. Thus, for example, it is permissible for anonymized data relating to the health of individuals to be shared, as long as the individuals cannot be identified from that data.

Data providers 105, 106 and 107 are similar to data provider 104 in that they include a connect server, a personal database, and other data provider functions, along with a firewall through which all communication must take place.

FIG. 4

Figure 4:
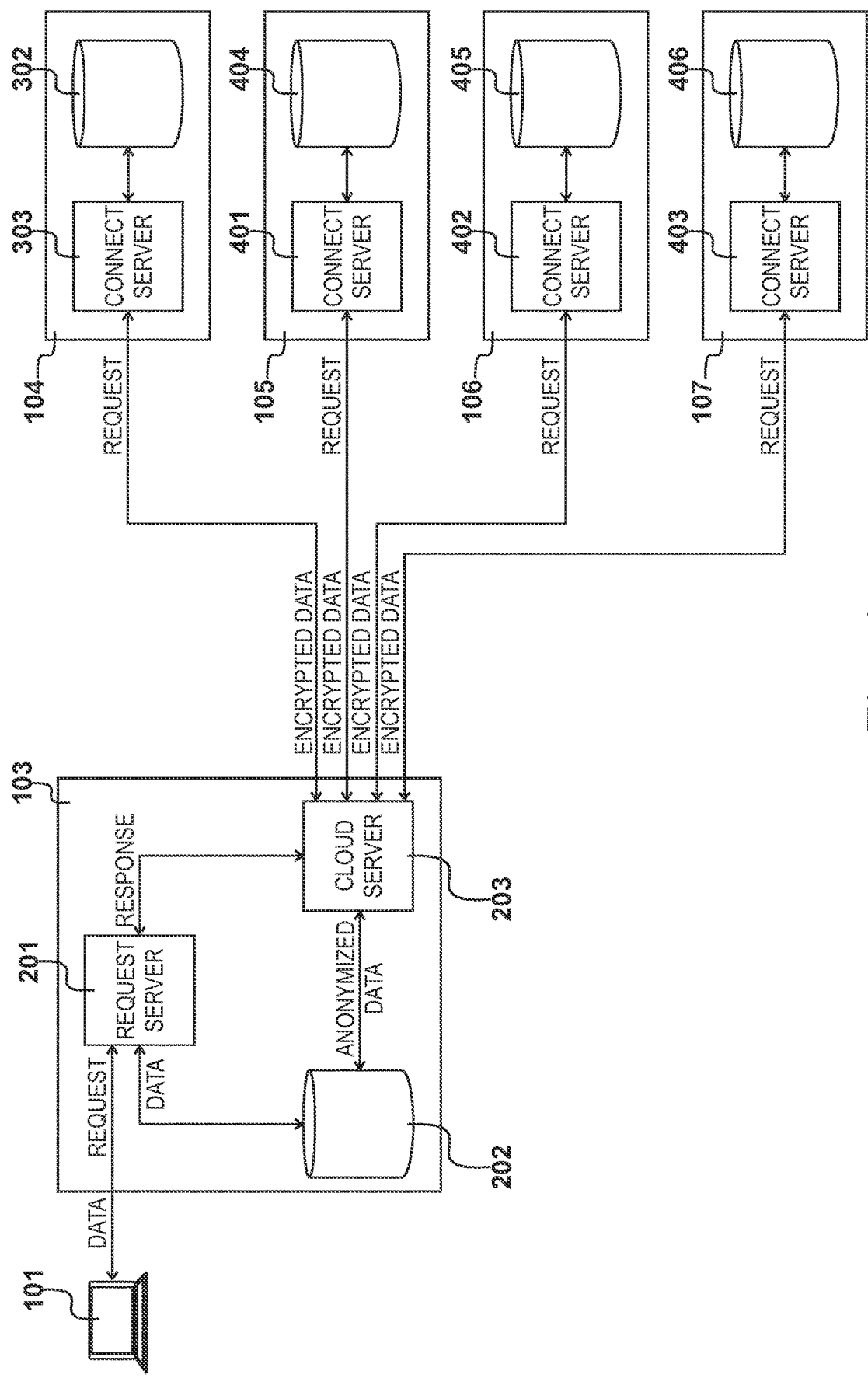
FIG. 4 is a schematic illustration of communication between devices shown in FIG. 1.

FIG. 4 is a schematic illustration of communication between the devices shown in FIG. 1. A user 101 issues a request for data to coordination station 103. This request is handled by request server 201, which interrogates database 202 and ascertains that the requested data is not currently cached. Request server 201 therefore sends a request to cloud server 203 to obtain the required data.

Cloud server 203 examines the request to determine which data providers hold the requested data. It may be possible to obtain it from only one data provider, in which case cloud server 203 will send a request to the relevant connect server and will receive anonymized data. However, if the data is held in two or more of the data providers, then requests must be made to each of them. Cloud server 203 knows which data providers hold particular types of data, but not the identity of the persons concerned. Thus, for example, a request issued by user 101 may be for height and weight data held by a data provider for persons aged 30-39.

Thus, cloud server 203 may issue a request to connect server 303 on data provider 104, connect server 401 on data provider 105, connect server 402 on data provider 106, and connect server 403 on data provider 107. Each connect server obtains the required data from its connected data source: connect server 303 is connected to database 302, connect server 401 is connected to database 404, connect server 402 is connected to database 405, and connect server 403 is connected to database 406. Upon receipt of a request from cloud server 203, each connect server retrieves a dataset from its connected data source, encrypts it, and provides it to cloud server 203, which collates all the encrypted datasets and saves the results as anonymized data in database 202.

In order for cloud server 203 to identify matching records from each data source, the requests are sent to the connect servers in turn. If cloud server 203 determines that the requested data is located on data providers 104 and 105, it will first send a request to connect server 303. Connect server 303 retrieves the requested data from personal database 302 as a dataset, and encrypts it. This encryption involves removing all personal identifying data; an identifier which is used in common across all the data providers is encrypted. It then returns the encrypted identifiers and the non-identifying information to cloud server 203. The encrypted identifiers are then used as anonymized identifiers for the data. They are never decrypted, as no other connect server nor any other entity holds all the encryption variables used by connect server 303.

Cloud server 203 then provides the encrypted identifiers to connect server 401, which identifies whether any data in database 404 is stored under the same identifiers. This is possible because all the connect servers hold a shared key that is used for part of the encryption process. Connect server 401 does not decrypt the received encrypted identifiers to match them against its own unencrypted identifiers, neither does it encrypt its own identifiers to match them against the received encrypted identifiers. Either of these solutions would mean that the connect servers could decrypt each others' data, thus removing the layer of anonymization. Rather, connect server 401 verifies the received encrypted identifiers against its own unencrypted identifiers, using a process that allows it to identify records having the same identifiers without either encrypting its identifiers or decrypting the received identifiers.

If connect server 401 finds any matching records, then it strips out any personal identifying data and sends the non-identifying data, along with the matched encrypted identifiers, to cloud server 203.

Cloud server 203 can then collate the data from connect servers 303 and 401 using the encrypted identifiers. However, cloud server 203 is unaware of the shared key held by the connect servers, and is therefore unable to either decrypt the encrypted identifiers or verify the encrypted identifiers against unencrypted personal identifiers it may be aware of. The data from connect servers 303 and 401 is therefore already anonymized. However, for enhanced security, the encrypted identifiers may be removed and replaced by alternative anonymized identifiers such as random numbers. Cloud server 203 therefore generates an anonymized ID for each of the collated non-identifying data records, stores them in database 202, and responds to a request server 201 with an indication of where the data is stored. Request server 201 then returns the anonymized data to user 101.

Thus, in this system, personal identifying data does not leave the data providers, and the non-identifying data from one data provider is not supplied to any other data provider. Each data provider is unaware of the identities of the other data providers, or even how many other data providers there are in the system. Cloud server 203 is unable to extract any personal information from the encrypted identifiers, and these may be removed before the anonymized data is placed in database 202. Thus, anonymized data is collated from a plurality of data sources, without any personal identifying data ever being shared.

Thus there is provided apparatus including a coordinating server, which in this example is cloud server 203, and at least a first and second server, which in this case are any of connect servers 303 and 401 to 403. In alternative language, there is provided first apparatus comprising a first processor and second apparatus comprising a second processor, which in this example are any of connect servers 303 and 401 to 403 and their respective processor or processors. There is also third apparatus comprising a third processor, which in this example is cloud server 203 and its processor or processors.

FIG. 5

Figure 5:
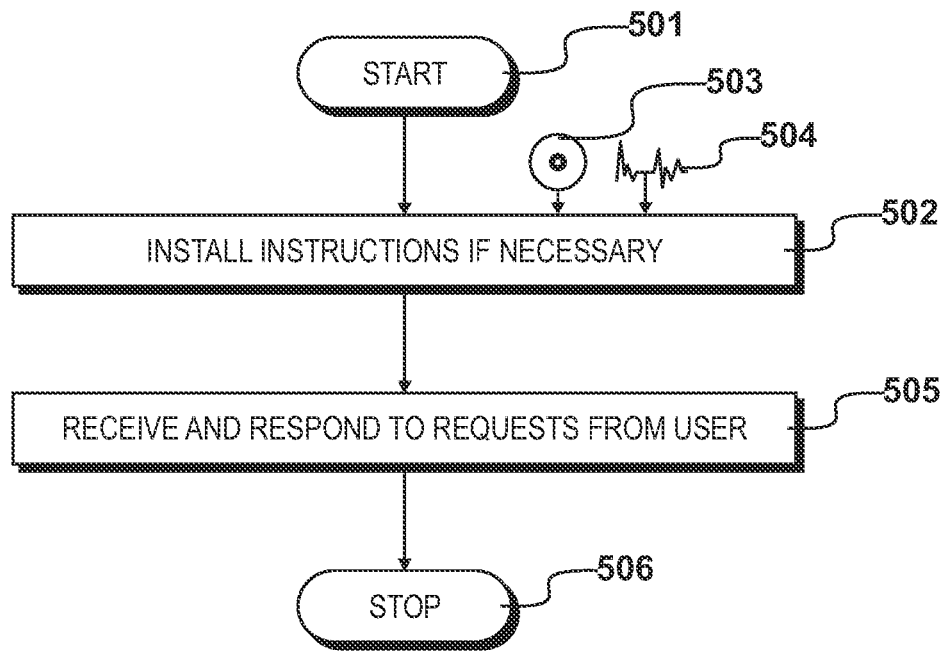
FIG. 5 details steps carried out by a processor to implement a request server shown in FIG. 2.

FIG. 5 details steps carried out by a processor to implement request server 201. As previously described, the processor may be one or more processing devices, in the same location or in networked locations, or a virtual processor distributed across many devices.

At step 501 the processor starts the server, and at step 502 instructions for the request server are installed if necessary, either from a computer readable medium such as CD-ROM 503, or via a network as instructions 504.

At step 505 the server receives and responds to requests for data from users, such as users 101 and 102. Eventually, the processor stops the server at step 506.

Step 505 consists of a plurality of processes, including creation and maintenance of user sessions, point-to-point security for communications, maintenance of a user database, maintenance and presentation of an interface through which users make requests, and so on. However, for the purposes of this description, only the basic steps taken to receive and respond to user requests will be further detailed.

FIG. 6

Figure 6:
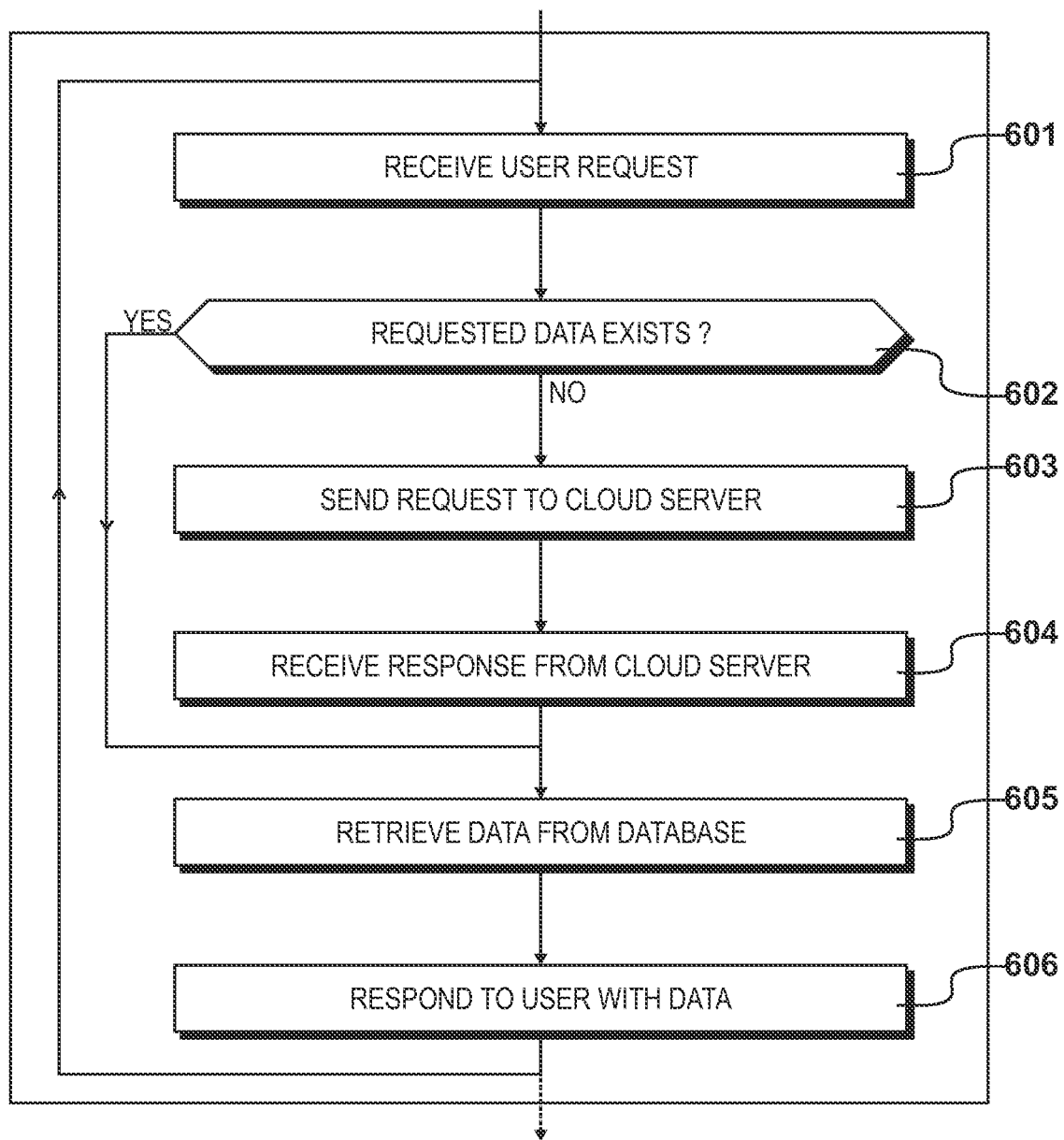
FIG. 6 details steps carried out during FIG. 5 to service a user request.

FIG. 6 details step 505 at which the processor of request server 201 receives and responds to user requests for data.

At step 601 a user request is received, for example from user 101. At step 602 a question is asked as to whether the data already exists in anonymized database 202, and if this question is answered in the negative then at step 603 the processor sends a request to cloud server 203 to obtain the required data. At 604 a response is received from the cloud server indicating that the required data has now been added to database 202.

At this stage, or if the question asked at step 602 is answered in the affirmative, the required data is retrieved from the database at step 605 and returned in an appropriate format to the user at step 606.

Control then returns to step 601 to service another user request.

FIG. 7

Figure 7:
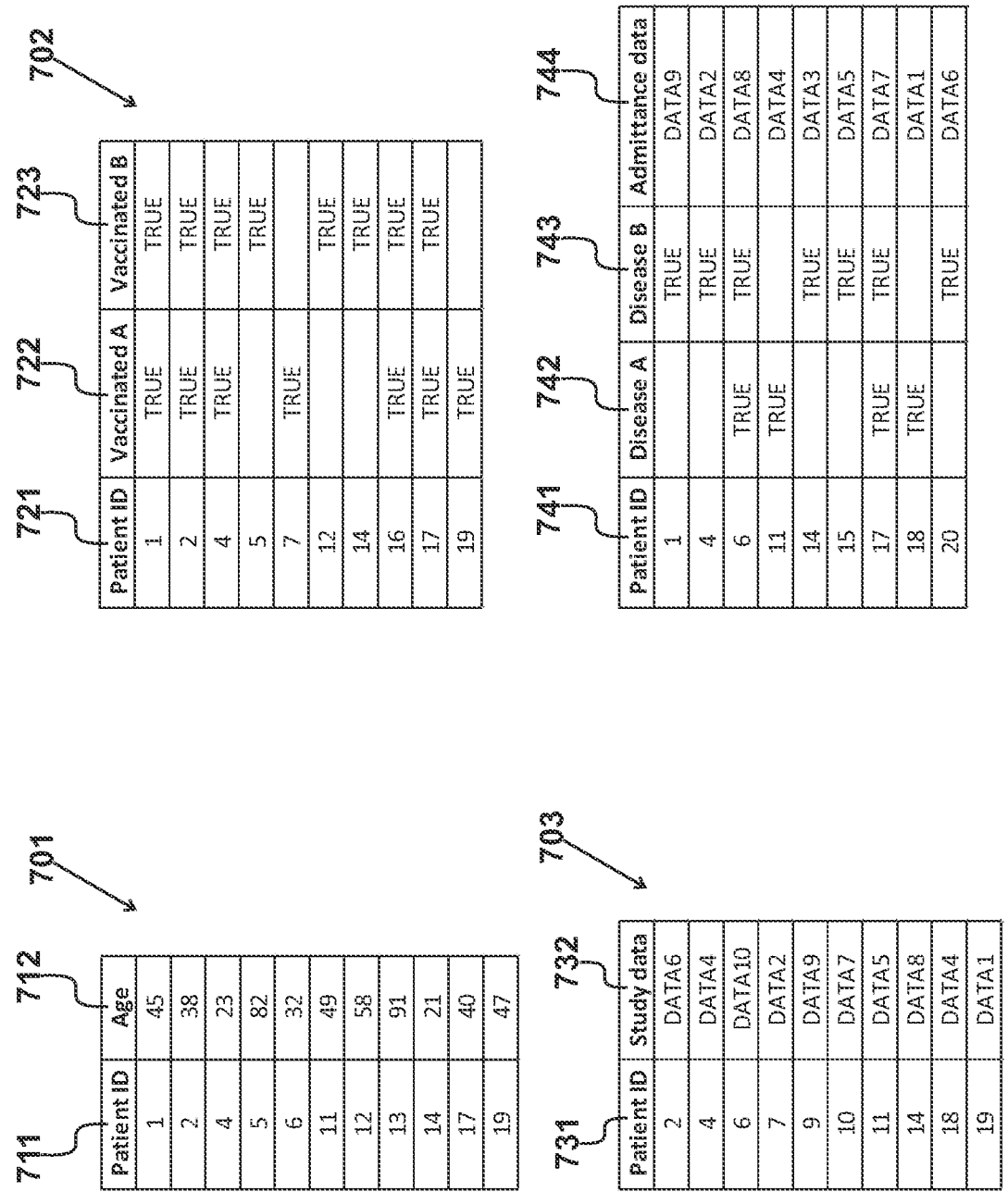
FIG. 7 illustrates an example of data held at data providers shown in FIG. 1.

FIG. 7 is an example of data held at a number of data providers, and examples of anonymized data that may be obtained by querying this data will be described with reference to FIG. 8.

In this example, there exist four tables of data, table 701, table 702, table 703 and table 704. Each table resides in the database of a different data provider 104 to 107. In this example the data shown is extremely simple, and it will be understood that in a real-world implementation there would generally be thousands of records stored in a multi-table database format, or in another format such as a spreadsheet. Each data provider is different, and decisions are made about storage of data depending on needs and resources.

Table 701 is stored on database 302 of data provider 104, which in this example is a database of information held by doctors' surgeries containing basic personal information. The table includes a patient ID field 711 and an age field 712, such that each record includes a patient ID and an age. The patient ID is personal identifying data, and it is used across all four data providers such that the same patient ID always identifies the same individual. Age 712 is non-identifying data, as it cannot be used to identify a particular individual.

Table 702 is stored on database 404 of data provider 105, which is a healthcare service that provides vaccinations. It stores data in table 702 on what vaccinations have been provided to which individuals. Each record in table 702 includes a patient ID field 721, and fields 722 and 723 indicating whether the individual has been vaccinated against each of two diseases, labelled here as Disease A and Disease B.

Table 703 is stored in database 405 of data provider 106, which is a repository of results from a clinical trial of a pharmaceutical. Each record in table 703 includes a patient ID field 731, and study data fields 732 relating to each individual who took part in a study. Fields 732 refers to a large number of linked fields that comprise longitudinal data.

Finally, table 704 is stored in database 406 of data provider 107, which is a hospital that stores data relating to individuals admitted to the hospital. For simplification, a small amount of typical data is shown in table 704, including a patient ID field 741, fields 742 and 743 indicating whether an individual was admitted and diagnosed with Disease A or Disease B respectively, and admittance data fields 744 containing data regarding the patient's health and treatment during that admission (while this is labelled DATA1, DATA2 etc. in the same way as field 732, it is not the same data).

Each of data providers 104 to 107 uses the same patient identifier to identify an individual, and therefore if the tables 701 to 704 were collated a great deal of information could be discovered. However, each data provider is ethically and legally bound not to disclose its data in any form that identifies the individuals concerned.

In this example, the patient identifier is a nationally-unique number allocated to each person in a country at birth, and it is therefore suitable for collating data relating to healthcare. In other examples, the patient identifier may be a social security number, a military identifier, an email address, a concatenation of personal data such as name and date of birth, and so on. Any identifier is suitable if it can be used to uniquely identify an individual. In order for data to be collated, each data provider must use the same identifier.

Although not described herein, it is possible for data providers to be in sets, wherein all the data providers in a set use the same unique identifier. If a data provider uses more than one unique identifier, it may be in more than one set. In such a scenario, a single coordinating server (such as cloud server 203) could communicate with all the sets of data providers, or there could be a plurality of coordinating servers, possibly one for each set of data providers The plurality of coordinating servers could be included in a single coordination station, or there could be a plurality of coordination stations. Load balancing, location and bandwidth considerations would typically be used to determine the optimum configuration of the system.

FIG. 8

Figure 8:
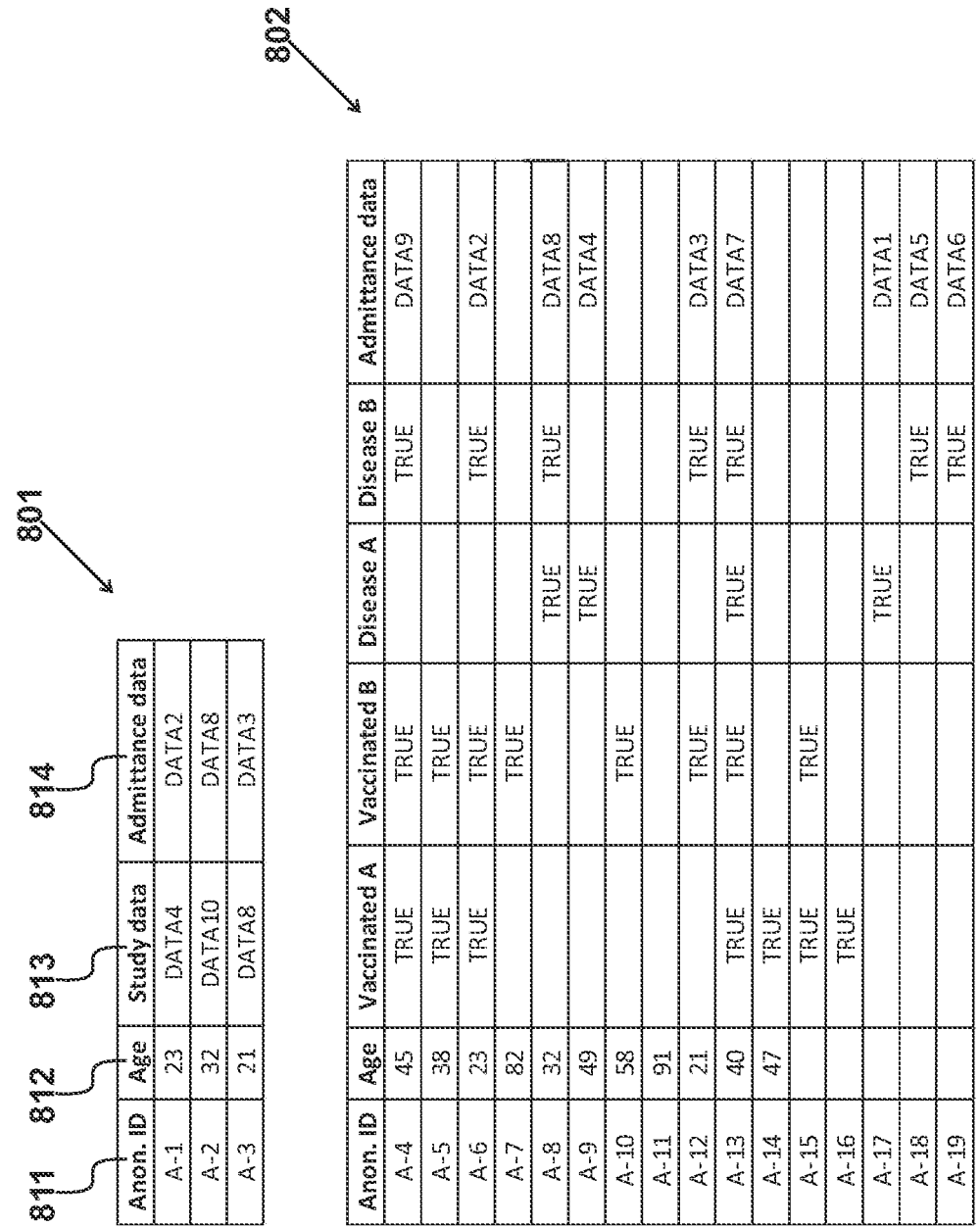
FIG. 8 illustrates an example of anonymized data obtained by querying the data shown in FIG. 7.

FIG. 8 illustrates two examples of data which may be requested by users. In the first example, user 101 wishes to retrieve data for all persons under the age of fifty who took part in the clinical trial and were admitted to hospital and diagnosed with disease B. On interrogating table 701, 703, and 704, it can be seen that three patients, with IDs 4, 6 and 14, fit these criteria, and the data on these three patients can be collated into anonymized table 801.

To produce this data, cloud server first determines that the required data (age, clinical trial data, and hospital data) resides on data providers 104, 106 and 107. It then sends a first request to data provider 104 for data on all patients under the age of fifty. Connect server 303 retrieves a dataset from database 302 comprising the eight records in table 701 that fulfil this criterion, which are those with patient IDs 1, 2, 4, 6, 11, 14, 17 and 19. It encrypts these patient IDs to produce encrypted identifiers; the encryption method uses the shared encryption key known by all the connect servers, plus an additional variable of some kind, known only to itself. It adds the encrypted identifiers to the dataset, and removes the patient IDs 711. It then returns this dataset, comprising encrypted identifiers and data from age field 712, to cloud server 203.

Cloud server then sends only the encrypted identifiers to data provider 106, with a request to retrieve all matching records from table 703. Connect server 402 cannot decrypt the encrypted identifiers, because it does not know the additional variable used by connect server 303, but it can verify, using the shared key, whether it holds any records having the same identifiers. It therefore retrieves a dataset from database 405 comprising the records in table 703, verifies the encrypted identifiers against the unencrypted patient IDs 731, and finds six matches: patient IDs 2, 4, 6, 11, 14 and 19. Connect server 402 is not provided with any information on why it should retrieve records having these identifiers, nor on what data was received by cloud server 203 from data provider 104. In addition, it is unable to decrypt any of the encrypted identifiers and thus can obtain no information from the two unverified encrypted identifiers. Therefore the only information that has been shared with data provider 106 is that the six verified identifiers exist in some other data provider.

Once connect server 402 has identified the six records containing identifiers that can be verified against the encrypted identifiers, it adds the matching encrypted identifier to each record and removes the patient IDs 731. It does not need to produce its own encrypted identifiers as no unmatched data has been requested. The encrypted identifiers have become anonymized identifiers, since they cannot be decrypted by any entity except connect server 303, which will not be provided with any further data in this specific process. Connect server 402 then returns the dataset, comprising encrypted identifiers and data from field 732, to cloud server 203.

Cloud server 203 is now in possession of two datasets, both including the same encrypted identifiers. It can therefore collate the two datasets. However, cloud server 203 has no knowledge of the individuals to whom this data refers, as it can neither decrypt nor verify the encrypted identifiers.

Cloud server 203 now provides the eight encrypted identifiers received from connect server 303 to data provider 107, along with a request for data on patients admitted to the hospital with Disease B. Connect server 403 first retrieves a dataset from database 406 by querying table 704 to find all individuals admitted to hospital with disease B, which is seven records, along with data 744 relating to their admissions. It then verifies the encrypted identifiers against the unencrypted patient IDs 741 in this dataset, and finds four matches, on patient IDs 4, 6, 14 and 17. It then modifies the dataset to strip out all personally identifying data, including the patient ID 741, and adds the verified encrypted identifier for each record. This dataset is returned to cloud server 203.

Thus cloud server 203 is now in possession of three datasets: eight records from table 701, five records from table 703 and four records from table 704. Each record includes an encrypted identifier. By creating a relationship between the encrypted identifiers and querying the datasets to identify records that appear in all three, a final dataset of three records is obtained. Alternatively, the cloud server could have collated the records from table 701 and table 703 first to obtain the four matches, and provided these four encrypted identifiers to connect server 107, which would have returned the three final results.

Cloud server removes the encrypted identifiers and adds alternative anonymized IDs, resulting in the dataset 801, which includes anonymized IDs 811, age 812, study data 813, and data 814 relating to admission to hospital for disease B. Dataset 801 is stored in anonymized database 202 for return to user 101.

Table 802 is a second example of an anonymized dataset obtained from the tables shown in FIG. 7. In this case, user 102 has made a request for all the records held in tables 701, 702 and 704, including the age of each individual, their vaccination history for Disease A and Disease B, and data on admission for hospital with either disease.

To fulfil this request, cloud server identifies that the required information (age, vaccination data, hospital data) is stored on data providers 104, 105 and 107. It first issues a request to data provider 104 for all the records in table 701. Connect server 303 retrieves a dataset from database 302 comprising all records in table 701, encrypts the patient IDs 711 to generate encrypted identifiers, and associates each encrypted identifier with the age field 712 for the individual. This dataset is then returned to cloud server 203.

Cloud server 203 then sends these encrypted identifiers to data provider 105, with a request for all data from table 702. Connect server 401 retrieves a dataset from database 404 comprising all records in table 702, and verifies the encrypted identifiers against the unencrypted patient IDs 721. For some of these it will find a match, and for others it will not—in this example there are eight records verified against the received encrypted identifiers, and two records for which the verification has failed. For the patient IDs that have been verified against an encrypted identifier, this encrypted identifier is added to the dataset. For the two unverified records in table 702 the patient ID 721 is encrypted to create encrypted identifiers that are added to the dataset, which is then returned to cloud server 203.

Cloud server 203 has therefore received a dataset from connect server 401 which includes a plurality of encrypted identifiers, some of which originated from connect server 303 and some of which originated from connect server 401. Because the encrypted identifiers are now serving as anonymized identifiers and will never be decrypted, it is not necessary for cloud server 203 to note which connect server generated which encrypted identifier. Cloud server 203 provides all these encrypted identifiers to data provider 107, with a request for all the data from table 704.

Connect server 403 retrieves a dataset from database 406 comprising all records in table 704, and verifies the received encrypted identifiers against the unencrypted patient IDs 741. Connect server 403 does not know that these encrypted identifiers have been generated by more than one connect server. It verifies the unencrypted identifiers in six records against these encrypted identifiers, leaving three records for which the verification has failed. For the patient IDs that have been verified against an encrypted identifier, this encrypted identifier is associated with the data in the dataset. For the three unverified records in table 704, the patient ID 741 is encrypted to create encrypted identifiers that are added to the dataset, which is then returned to cloud server 203.

Now that the requested information has been provided by the connect servers, it is not necessary for cloud server 203 to identify which connect server generated which encrypted identifier. The three datasets are collated by creating relationships between the encrypted identifiers and running a query that selects all records. In the resulting dataset, the encrypted identifiers are removed and an anonymized identifier is inserted, resulting in table 802 which contains all data from table 701, 702 and 704 collated by but not containing the patient IDs, without cloud server 203 ever being informed what these patient identifiers are.

Thus, the system can operate in two modes. In the first mode of operation, as described with reference to table 801, only data that is matched across all the queried databases is required, referred to in SQL as an inner join. In this case only the first-queried connect server needs to generate encrypted identifiers. In the second mode of operation, as described with reference to table 802, data that is unmatched is also required, referred to in SQL as an outer join. In this mode other connect servers than the first will generate encrypted identifiers.

In practice, cloud server will operate in both modes depending on the data required. For example, a query created in order to retrieve requested data may need an inner join between two tables and an outer join to a third table. The query design will additionally dictate in what order the data providers are queried. However, for the purposes of the encryption, it is irrelevant in what order they are queried.

Following the specific examples shown in FIGS. 7 and 8, the generalised method will now be described.

FIG. 9

Figure 9:
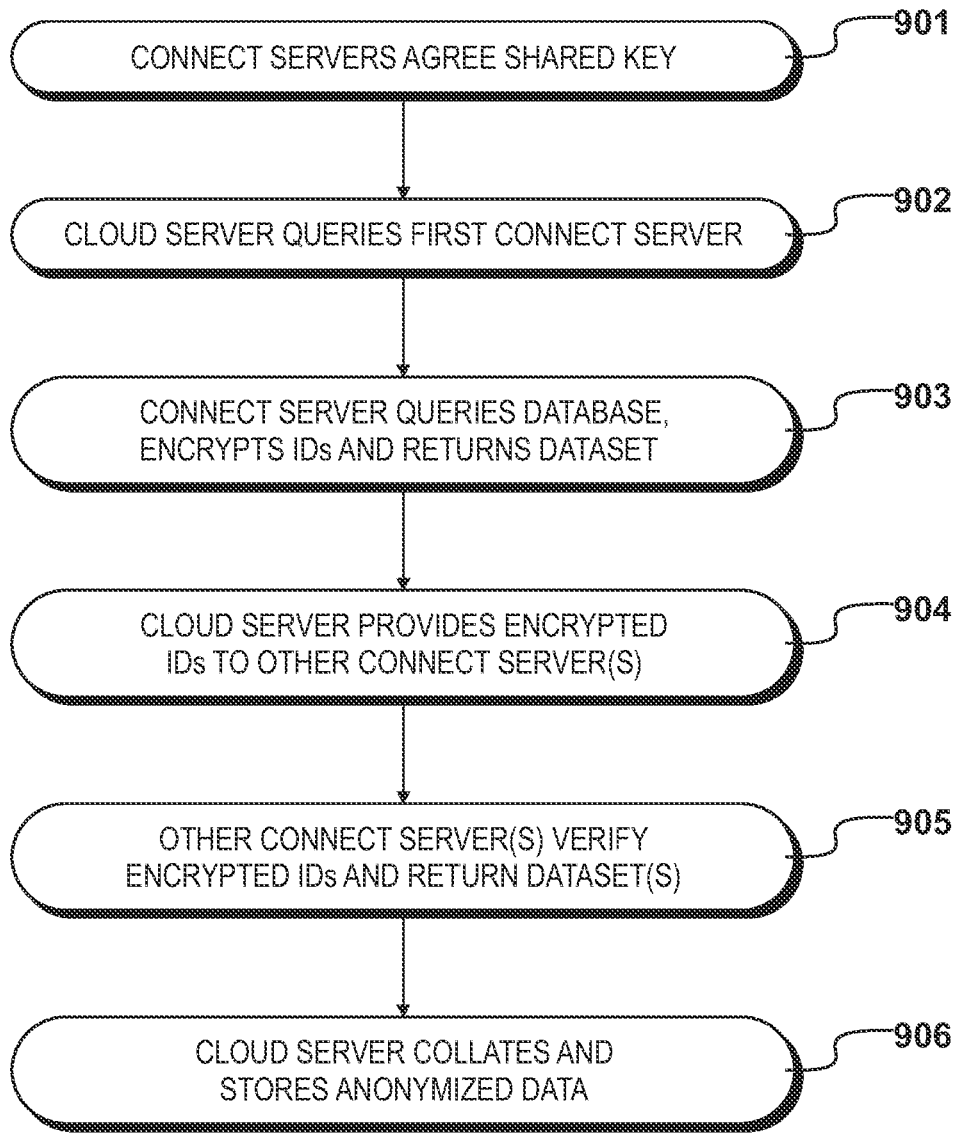
FIG. 9 illustrates a process carried out by servers shown in FIGS. 2, 3 and 4.

FIG. 9 is a process diagram showing steps carried out by cloud server 203 and the connect servers 303 and 401 to 403. These will be described in detail with respect to FIGS. 10 to 18.

At step 901 connect servers 303 and 401 to 403 agree a shared encryption key. This shared key must exist in order to allow a connect server to verify an encrypted identifier against its own identifiers. Cloud server 203 facilitates the generation of this shared encryption key, since the connect servers do not communicate with each other, but cloud server 203 is unaware of the shared encryption key and thus cannot verify encrypted identifiers against a list of identifiers. This prevents the hypothetical situation where an untrustworthy coordination station could obtain or guess a list of identifiers, and verify the encrypted identifiers against this list.

At step 902 cloud server 203 queries a first connect server, and at step 903 that connect server returns a dataset, which includes encrypted identifiers and data corresponding to the identifiers.

At step 904 cloud server 203 provides only the encrypted identifiers to other connect servers, either simultaneously as in the first mode of operation, or in sequence as in the second mode of operation. At step 905 these connect servers verify the encrypted identifiers against unencrypted identifiers in their own data sources, and return datasets that also comprise a number of encrypted identifiers and data corresponding to the identifiers.

The connect servers do not decrypt the encrypted identifiers and do not know the identity of the other connect servers, and no data other than encrypted identifiers is provided to them; therefore, if one of the data providers is untrustworthy there is no risk to the data on the other data providers.

At step 906 cloud server 203 collates these datasets by creating relationships between the encrypted identifiers, and then replacing the encrypted identifiers with anonymized identifiers. Alternatively, since the encrypted identifiers are already anonymized, it may not be necessary to replace them.

FIG. 10

Figure 10:
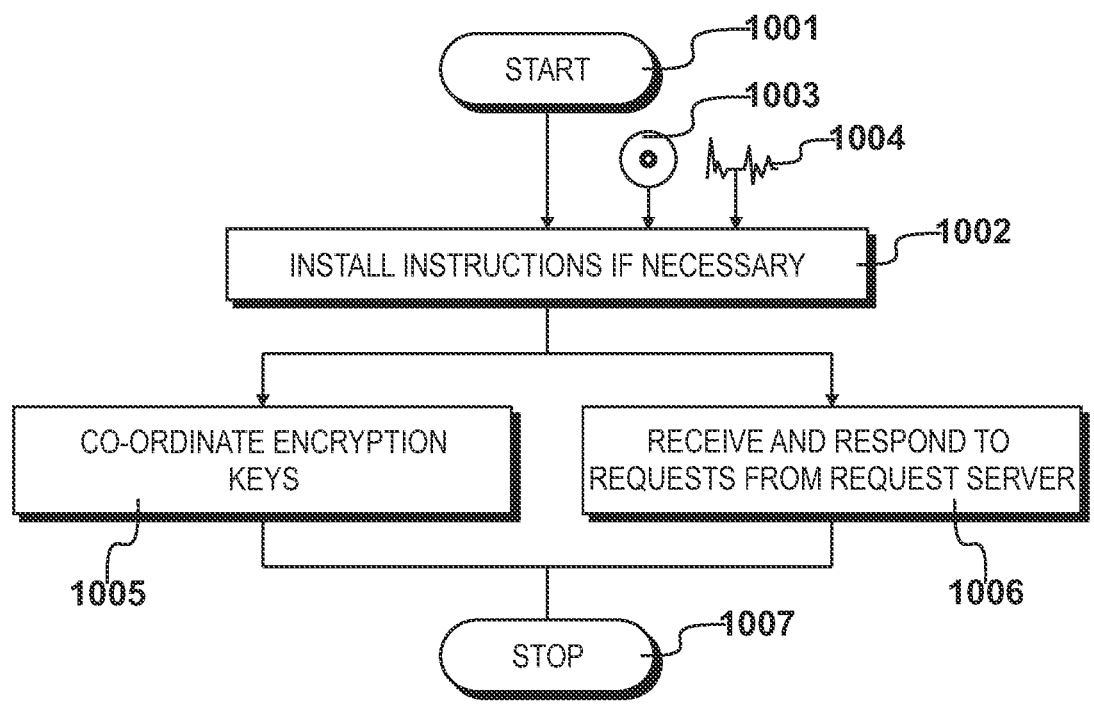
FIG. 10 details steps carried out by a processor to implement a cloud server shown in FIG. 2.

FIG. 10 shows steps carried out by a processor to implement cloud server 203. As with request server 201, this processor may be one or more processing devices, in the same location or in networked locations, or a virtual processor distributed across many devices.

At step 1001 the processor starts the server, and at step 1002 instructions for the cloud server are installed if necessary, either from a computer-readable medium such as CD-ROM 1003, or via a network as instructions 1004.

The cloud server 203 then runs, and it comprises two processes. In process 1005 it coordinates the generation of encryption keys. This process will not be described in detail herein, but will be further discussed with reference to FIG. 11. In process 1006 it receives and responds to requests from request server 201, as will be described further with reference to FIG. 13.

Both these processes run until the processor stops the server at step 1007.

Other processes run by cloud server 203 are not described herein. For example, it maintains a cache 304 of anonymized data, maintains a map of the databases on the data providers, maintains sessions and secure communications with the connect servers, and so on.

FIG. 11

Figure 11:
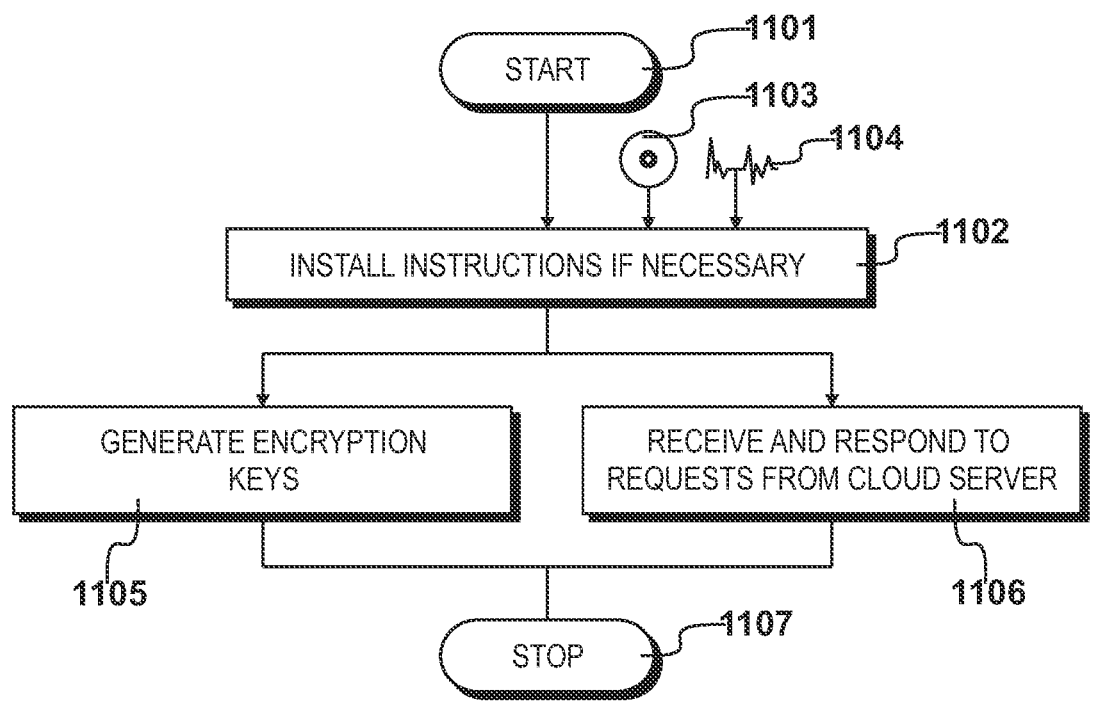
FIG. 11 details steps carried out by a processor to implement a connect server shown in FIG. 3.

FIG. 11 details steps carried out by a processor to implement connect server 303. Steps carried out to implement connect servers 401 to 403 are identical. As with request server 201 and cloud server 203, this processor may be one or more processing devices, in the same location or in networked locations, or a virtual processor distributed across many devices.

At step 1101 the processor starts the server, and at step 1102 instructions for the connect server are installed if necessary, either from a computer-readable medium such as CD-ROM 1103, or via a network as instructions 1104. It is essential that connect server 303 is installed behind firewall 305, as it needs access to the personal data in database 302. Thus, once it is installed data provider 104 has full control of connect server 303. It cannot be altered by coordination station 103 or by any other party outside firewall 305.

Similarly to cloud server 203, connect server 303 runs two processes. In process 1105 it generates encryption keys. In order for encryption of the identifiers to take place, each connect server must hold a copy of a shared encryption key, known to all the connect servers but not to any third party. The protocol for generating a shared encryption key is co-ordinated by cloud server 203 between all the connect servers, but the cloud server does not know the key. Therefore, at step 1005 cloud server 203 instigates the generation of keys by each connect server at step 1105. This will not be described in detail herein, but a typical procedure would be for the cloud server to instruct each connect server to generate one or more encryption keys and then receive at least one public key from each connect server. The cloud server provides these to all other connect servers, and the connect servers individually generate a shared key, which is identical across the servers. However, no other party, in particular cloud server 203, is able to generate the shared key. Any suitable method for generating a shared key may be used, and it may vary based on the format of the shared key. In this embodiment, as discussed with reference to FIG. 17, the shared key is a point on a pre-provided elliptic curve, but in other embodiments the shared key could have a different format. The format of the key will determine the procedure for generating it.

Processes 1005 and 1105 to generate the shared key may run with any suitable frequency. Cloud server 203 may initiate the generation of a new shared key on every iteration of process 1006, i.e., every request from request server 201. Alternatively, cloud server 203 may initiate the generation of a new shared key regularly, such as every day, every week, or every month, or after step 1006 has run a certain number of times. As long as a shared key is valid, the connect servers can cache encrypted identifiers, as will be described further with reference to FIG. 16; however, the whole system is more susceptible to hacking if a shared key is used for a long period, as that provides more time for brute force attacks on the encryption. Therefore, there is a compromise to be found between security and efficiency. In this embodiment the shared keys are regenerated every night, with each connect server then caching all identifiers in its connected database overnight, ready to receive requests the next day.

Figure 14:
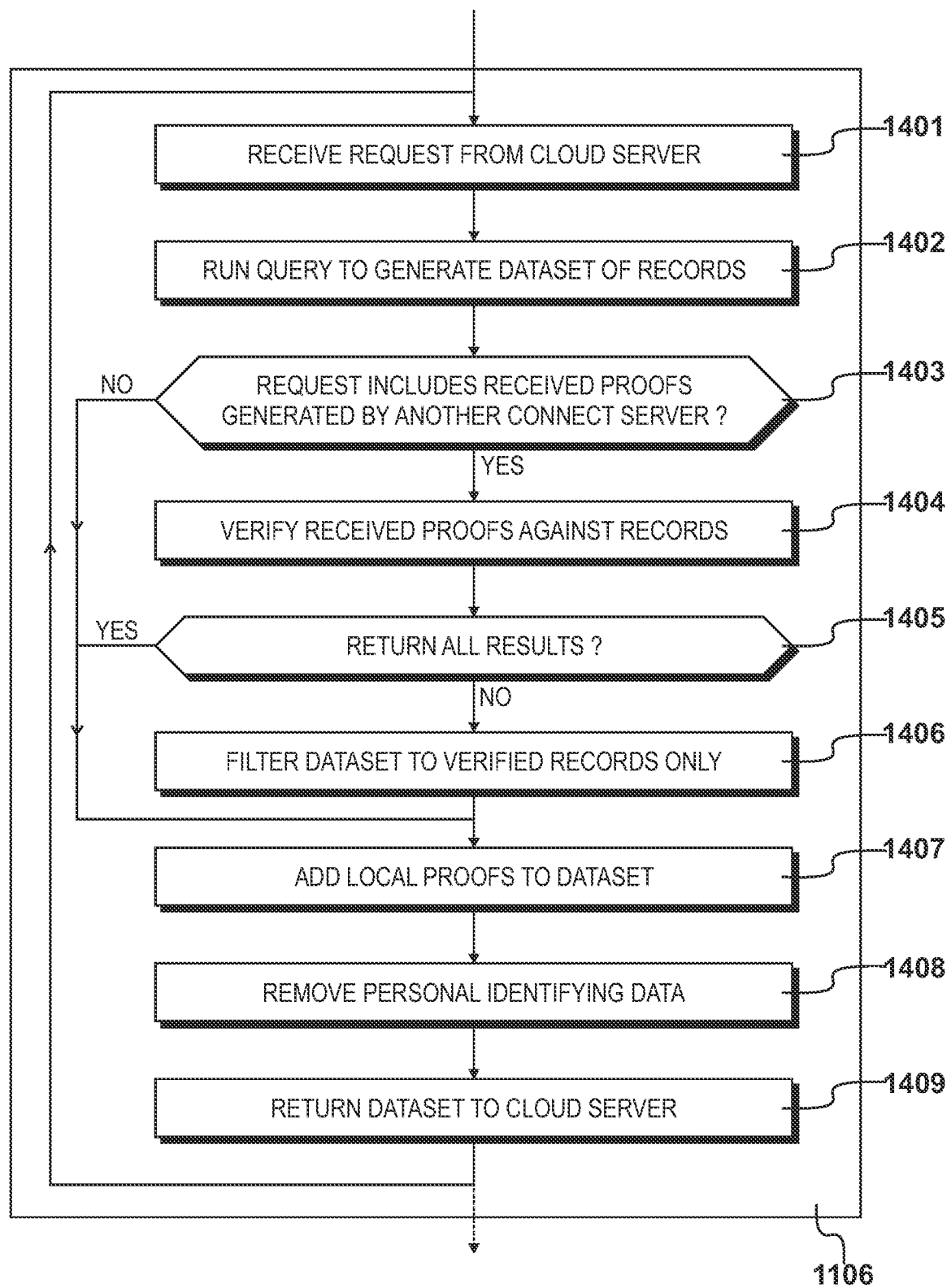
FIG. 14 details steps carried out during FIG. 11 to service a request for data.

In process 1106 connect server 303 receives and responds to requests from cloud server 203, as will be further detailed with respect to FIG. 14.

Both these processes run until the processor stops the connect server at step 1107.

Other processes run by connect server 303 are not described herein. For example, it provides data to cloud server 203 regarding the structure of database 302, maintains a session and secure communications with the cloud server, and so on.

FIG. 12

Figure 12:
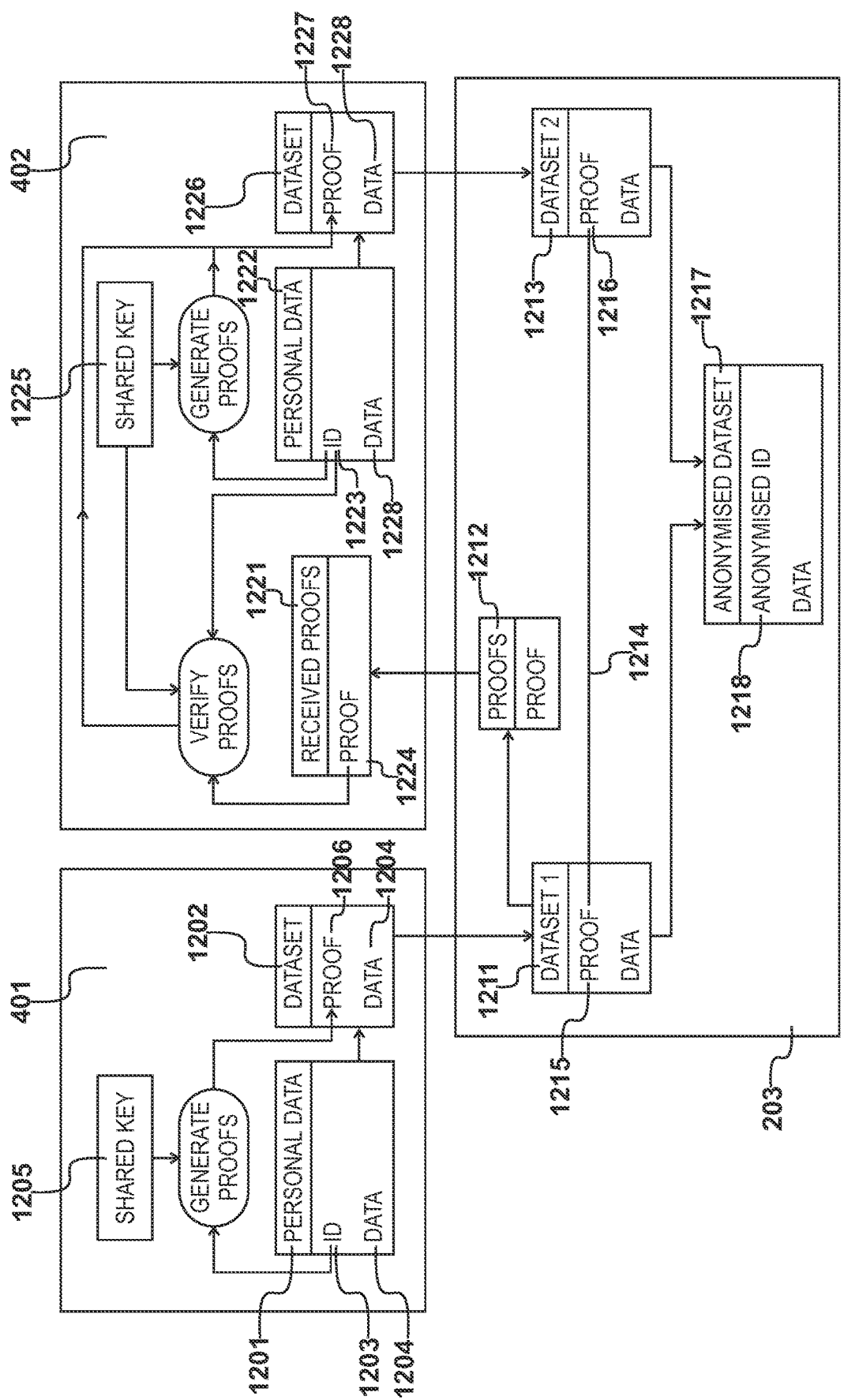
FIG. 12 is a schematic illustration of communication between servers shown in FIGS. 2, 3 and 4.

FIG. 12 is a schematic illustration of the communication of encrypted identifiers and corresponding data between cloud server 203 and two connect servers 401 and 402. Communications between the cloud server and the other connect servers are the same, no matter how many connect servers are connected to the cloud server.

As previously described, cloud server 203 has received a request for data from request server 201. In this example, cloud server 203 has ascertained from its map of the database structures that the requested data is stored on data providers 105 and 106, and has determined the structure of the required query. Cloud server 203 begins by sending a request for data to connect server 401 on data provider 105, which retrieves a dataset comprising the requested data from database 404, shown in FIG. 12 as personal dataset 1201. This may be every record and field in database 404, or may be a subset of the records and fields generated by a query.

Personal dataset comprises identifiers 1203 and corresponding data 1204. Connect server 401 encrypts the identifiers 1203 using shared key 1205 to generate proofs 1206, adds the proofs to the dataset and removes the original identifiers 1203, thus modifying dataset 1201 to produce dataset 1202. Each record in dataset 1202 includes a proof 1206, and the corresponding data 1204 that was associated with the original identifier 1203.

In an alternative method of generating dataset 1202, connect server 401 queries database to retrieve identifiers 1203, encrypts the identifiers, and then retrieves the corresponding data to create a dataset. In this method, personal dataset 1201 does not exist. In practice, the most efficient way of retrieving the data and generating a dataset will depend upon the structure of the database, the number of records, the complexity of the queries, and the capabilities of the connect server. Each connect server may include functionality to automatically choose its data retrieval method, or to allow an administrator to specify the method.

Connect server 401 may further modify dataset 1202 to remove other personal identifying data. It is possible that cloud server 203 may have requested certain data, but rules imposed by data provider 105 prevent connect server 401 from providing it. Some data may not be considered to be identifying on its own, but when combined with other fields it may become identifying. As an example, a town of residence is not identifying and nor is a diagnosis of a disease, but when combined the two pieces of data may become identifying, if it is feasible that there exists a town in which only one person has that disease.

Once connect server 401 has finished modifying dataset 1202 it is provided to cloud server 203, which stores it as dataset 1211.

In this embodiment, identifiers are encrypted by generating a non-interactive zero-knowledge proof of knowledge of each identifier 1203, using shared encryption key 1204. In cryptography, a zero-knowledge proof of knowledge is a piece of information produced by one party to prove that it knows a secret without revealing the secret. A second party uses the proof to verify that the first party does indeed know the secret, but again without revealing the secret. In this case, the secret is identifier 1203. Connect server 401 creates proof 1205, which is used by connect server 402 to verify that some other connect server knows identifier 1203, but without revealing it.

Thus in this embodiment, the encrypted identifier is a zero-knowledge proof of knowledge, referred to herein as a proof. In other embodiments, other suitable encryption methods may be used that allow a connect server to verify that a received encrypted identifier is the same as a local unencrypted identifier, without being able to decrypt the encrypted identifier and without directly communicating with the connect server that carried out the encryption.

Cloud server 203 extracts the proofs 1215 from dataset 1211 to create a set 1212 of proofs, which it sends to connect server 402. Connect server 402 receives this as received proofs 1221.

Along with proofs 1212, cloud server 203 also sends a request (not shown) for the specific information required, and connect server 402 retrieves this from database 405 as personal dataset 1222. This may be every record and field in database 405, or may be a subset of the records and fields generated by a query. Each record includes an identifier 1223, which can be considered as a local identifier in contrast to the received proofs 1212, and corresponding data 1228 associated with the local identifier 1223.

It is usual for zero-knowledge proof of knowledge protocols to be used to verify that two parties are in possession of the same piece of information, for example a password. However, in the invention described herein the protocol is used to discover whether any local identifier 1223 in personal data 1222 is the same as an identifier 1203 that has been encrypted by connect server 401 as a proof 1205. Thus connect server 402 verifies, using shared key 1225, every proof 1224 in received proofs 1221 against every local unencrypted identifier 1223 in personal data 1222. A number of these verification processes will probably fail because the identifiers do not match. However, if personal dataset 1201 and personal dataset 1222 do share one or more records having the same identifiers, then one or more verification processes will succeed. When this occurs, connect server 402 modifies personal dataset 1222 to create dataset 1226, by adding the verified proof as proof 1227 and removing the identifier 1223. As described above, personal dataset 1222 may alternatively be bypassed, and instead connect server may first retrieve only the identifiers for verification, and then retrieve the corresponding data only if required.

If, in addition to matching received proofs 1221, connect server 402 has also been requested to return additional data that does not match (the second mode of operation described with reference to FIG. 8) then it carries out a further step of generating proofs from local identifiers 1223 using shared key 1225, and storing them as proofs 1227 with corresponding data 1228 in dataset 1226.

When connect server 402 has completed both the verification and the generation processes, dataset 1226 is provided to cloud server 203, which saves it as dataset 1213. As shown by line 1214, these datasets can now be treated as a relational database in which a relationship can be made between proof 1215 in dataset 1211 and proof 1216 in dataset 1213. Thus the datasets can be collated into anonymized dataset 1217, in which all the proofs may have been removed and replaced by anonymized identifiers 1218. Alternatively, if cloud server 203 requires more information from another connect server, then proofs 1216 are extracted from dataset 1213 and provided to another connect server. Although the process of verifying proofs is only shown in this figure on connect server 402, all connect servers are identical and all carry out the verification process if provided with proofs. In some circumstances, depending on the structure of the query created by cloud server 203, the proofs could even be supplied back to a data provider that has already been queried in order to obtain another dataset.

In a classic zero-knowledge proof of knowledge protocol, the two parties interact in order for the second party to verify that the first party knows the secret. In the invention described herein, it is important that the data providers do not communicate with each other, as otherwise data would pass from one data provider to another data provider, which would be able to identify the individuals to which that data belonged once the proofs were verified. Therefore, data is only provided to cloud server 203, which cannot verify the proofs. Because the data providers do not communicate, a non-interactive zero-knowledge protocol is used. This requires the parties to agree a shared key beforehand, which is shared key 1205 on connect server 401 and shared key 1225 on connect server 402. Although these are discrete pieces of information each generated by their respective connect server, they are identical. Because it is discretely generated on each connect server, cloud server 203 does not know the shared key.

Thus there is herein described a method of providing anonymized data. At a first server, which in this example is connect server 402, connected to a first data source which in this example is database 405, a shared encryption key is generated, which in this example is shared key 1225. The first server receives, from a networked location which in this example is cloud server 203, a first message, which in this example is received proofs 1221 potentially accompanied by a database query. Thus the message comprises a first encrypted identifier that the first server is unable to decrypt, which in this case is a received proof 1224. It retrieves a first dataset, which in this example is dataset 1226, from the first data source and returns it to the networked location. In order to retrieve the first dataset, the first server obtains, from the first data source a set of local unencrypted identifiers, shown in this example at 1223. The set may comprise a single unencrypted identifier or more than one. Using the shared encryption key, for each of the local unencrypted identifiers the first server verifies the encrypted identifier against the local unencrypted identifier to obtain either a successful or failed verification. If the verification is successful, it obtains, from the first data source, first corresponding data, which in this example is data 1228, that is associated with the local unencrypted identifier. Assuming that the encrypted identifier is verified against one of these local unencrypted identifiers, the first server generates the first dataset that comprises the first corresponding data. In this embodiment, the dataset also includes the first encrypted identifier at proof 1227, but if only a single encrypted identifier is received and verified then this might not be necessary.

The encrypted identifier contained in the message received by the first server has been generated by a second server, which in this example is connect server 401, connected to a second data source, which in this example is database 404. The second server also generates an encryption key, which in this example is shared key 1205, which is identical to that generated by the first server. It obtains a third identifier, which in this example is identifier 1203, from the second data source, and also third corresponding data, which in this example is data 1204. It encrypts the third identifier using the shared encryption key to generate the first encrypted identifier, which in this example is proof 1206 that will be passed to the second server as received proof 1224. It generates a second dataset, which in this example is dataset 1202, that comprises the first encrypted identifier and the third corresponding data, and provides it to a networked location, which in this example is cloud server 203.

This process is coordinated by a coordinating server, which in this example is cloud server 203. It receives the second dataset from the second server, in this example as dataset 1211. It extracts the first encrypted identifier from the data, in this example as proofs 1212, and sends the first message, in this example received proofs 1221, to the first server. It then receives the first dataset from the first server, in this example as dataset 1213. It then collates the corresponding data from the datasets to provide anonymized data, which in this example is data 1217.

Processes 1006 and 1106, which implement the protocol shown in FIG. 12, will now be described.

FIG. 13

Figure 13:
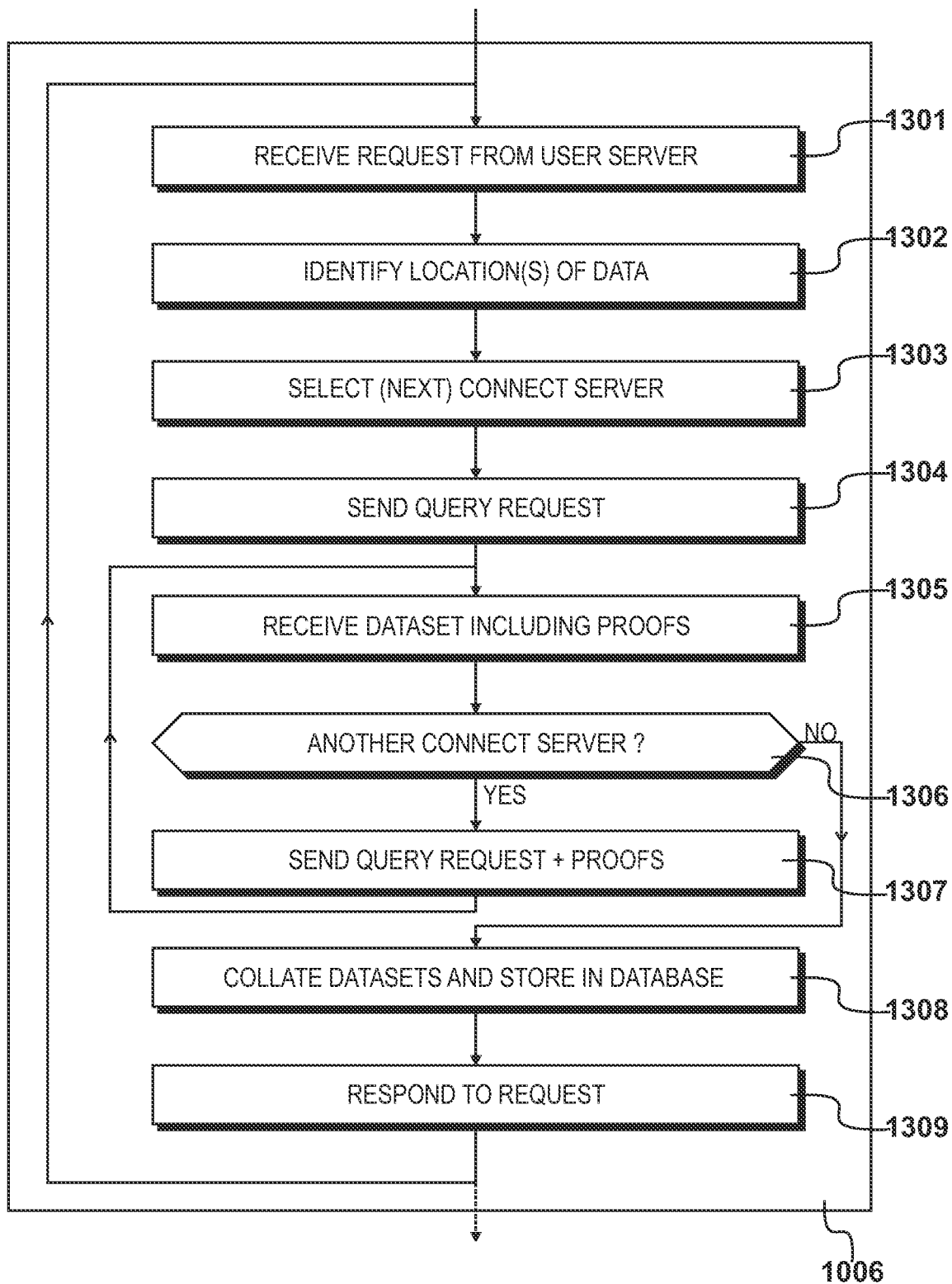
FIG. 13 details steps carried out during FIG. 10 to service a request for data.

FIG. 13 details step 1006 at which cloud server 203 receives and responds to requests from request server 201. At step 1301 a request, sent by request server at step 602, is received, and at step 1302 the location or locations of the requested data are identified. If the data resides on a single data provider, then cloud server 203 can make a simple request for anonymized data, which will not be described further. In this description it is assumed that the data resides on more than one data provider.

Cloud server 203 maintains a map of the structure of the data on all databases in order to be able to identify the locations of requested data and construct a query. Once the cloud server 203 has constructed the query, the first connect server to be queried is selected. For a simple query using only inner joins it does not matter which connect server is queried first. However, for a more complex query with nested outer joins the order may be important. A connect server is selected at step 1303 and a query request is sent at step 1304.

At step 1305 a dataset is received from this connect server, which comprises a set of records, each record being uniquely identified by a proof. In other embodiments, the dataset may be more complex than a set of records or may not be in a database format, but each piece of data must be associated with a proof.

At step 1306 a question is asked as to whether there is another connect server to query, and if this question is answered in the affirmative then at step 1307 another query request is sent, which includes all the proofs in the received dataset.

Control is then returned to step 1305 and another dataset is received from the next connect server, which again is a set of records, each uniquely identified by a proof.

Eventually the question asked at step 1306 is answered in the negative, to the effect that there is not another connect server to query, and at step 1308 the received datasets are collated and stored in database 202.

At step 1309 cloud server 203 responds to request server 201 with an indication of where the data is to be found in database 202, for example a list of anonymized IDs or a table in the database. The request server can then retrieve this data and respond to the user request at step 606.

FIG. 14

FIG. 14 details step 1106 at which a connect server receives and responds to requests from cloud server 203.

At step 1401 a request is received from the cloud server, sent at step 1304 or 1307. This request includes an indication of a database query, and an indication of whether the returned dataset should include matched data only or all records in the query. Further, the request may or may not include a list of proofs, depending on whether the connect server is the first to be queried.

At step 1402 the connect server runs a query to generate a dataset of records, which may be a subset of the database or all records in the database. At step 1403 a question is asked as to whether the request received includes received proofs from another connect server, and if this question is answered in the affirmative then at step 1404 the received proofs are verified against the identifiers in the records in the retrieved dataset, as will be further described with reference to FIG. 15.

At step 1405 a question is asked as to whether the request received indicates that all queried results should be returned, or only those that match the received proofs. If this question is answered in the negative, to the effect that only matching records should be returned, then at step 1406 the dataset is filtered to matched records only.

At step 1407 local proofs are added to the dataset, if required. This will occur if the connect server is the first to be queried, or if the question asked at step 1405 was answered in the affirmative to the effect that unmatched results should be returned. This step will be described further with reference to FIG. 16.

At step 1408 any personal identifying data that may have been requested by cloud server 203 but which should not be provided is removed, and at step 1409 the final dataset is returned to cloud server 203, which receives it at step 1305.

In this embodiment the connect server runs a single query on the database to retrieve all queried data, and then removes unmatched records if they are not required. In another embodiment, the connect server might run a first query at step 1402 to retrieve only identifiers, carry out the verification, and then run a second query to obtain the corresponding data. In a still further embodiment, the connect server may retrieve each identifier individually for verification and then generate a dataset from the matched records. Which method is used will be determined by the structure of the data, the amount of data required, the time taken to query the database, and so on; because each data provider stores data in its own way, the instructions for each connect server may include a number of different methods. Each connect server may include functionality to automatically alter its data retrieval method, or to allow an administrator to specify the method. Functionality may also be included to allow the administrator of a data provider to specify rules for statistical disclosure control, to ensure that no personal identifying data is provided.

Depending on the format of the identifiers, additional steps may be required to encode them into a format that can be used in the steps of generating a local proof or verifying a received proof. The algorithm described herein uses elliptic curve cryptography, which requires a numerical format, and therefore if the identifiers include non-numerical characters they will need encoding into a unique numerical identifier using a suitable encoding algorithm.

FIG. 15

Figure 15:
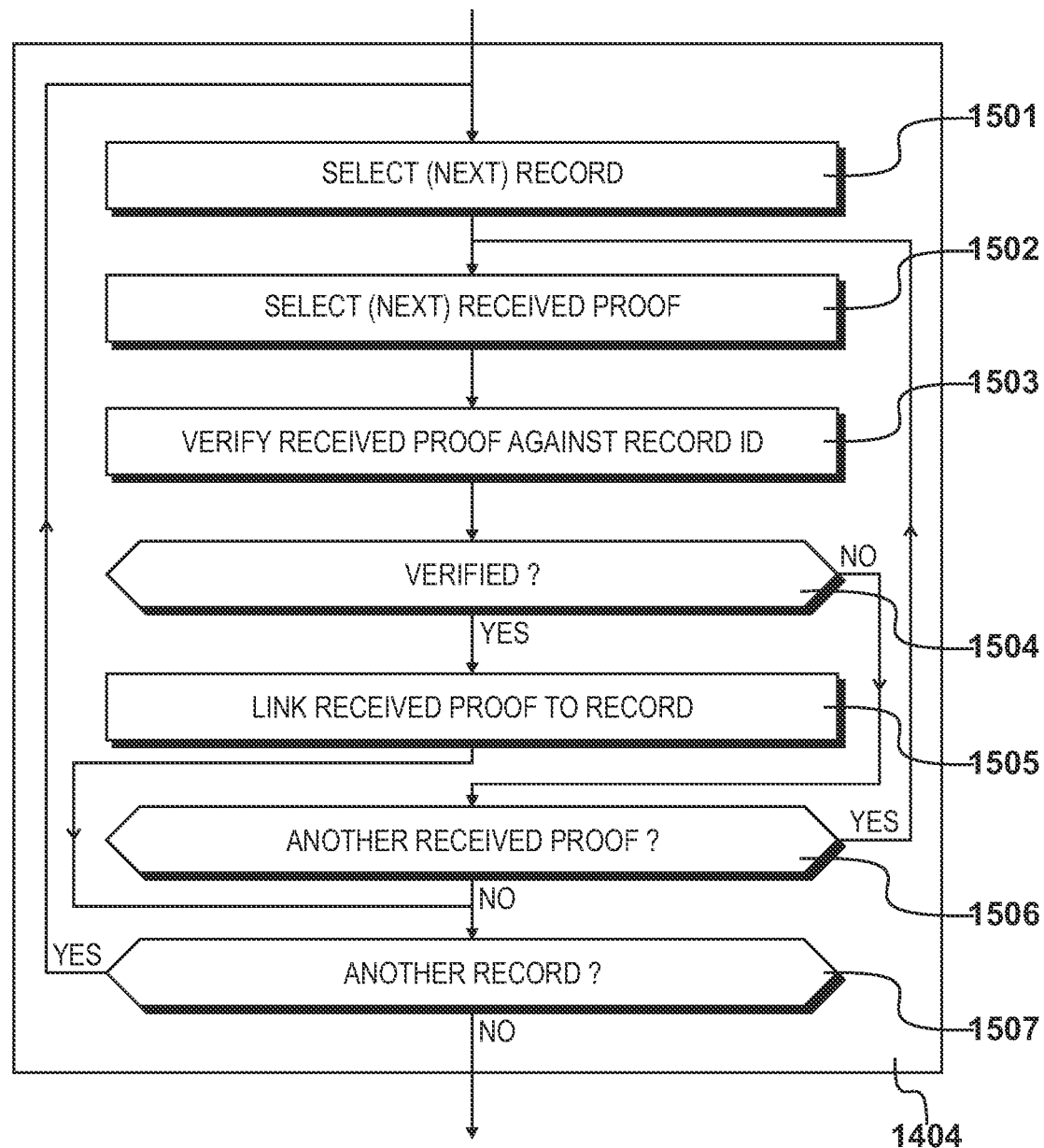
FIG. 15 details steps carried out during FIG. 14 to verify received proofs.

FIG. 15 details step 1404 at which received proofs received are verified against identifiers in records in the retrieved dataset. At step 1501 the first record in the dataset is selected, and at step 1502 the first received proof is selected. At step 1503 the received proof is verified against the unencrypted identifier in the record, as will be further described with reference to FIG. 18, and at step 1504 a question is asked as to whether this verification was successful. If this question is answered in the affirmative then at step 1505 the received proof is linked to the record in the dataset, for example by adding a field to a table, by creating a link between the retrieved dataset and the table of received proofs, or by any other method appropriate to the format of the dataset. If the question is answered in the negative then at step 1506 a question is asked as to whether there is another received proof, and if this question is answered in the affirmative then control is returned to step 1502 and the next received proof is selected for verification. Alternatively, if the question is answered in the negative then all the received proofs have been checked against this record and no verification was successful, meaning that the identifier in this record is not the same as any identifier encrypted as a received proof.

At this point, and following step 1505, a question is asked at step 1507 as to whether there is another record in the dataset, and if this question is answered in the affirmative then control is returned to step 1501 and the next record is selected. Alternatively, the question is answered in the negative and step 1404 is completed.

Thus, this process iterates through every record in the retrieved dataset, and attempts to verify each received proof against the identifier in the record. In another embodiment the reverse process could take place, by iterating through the received proofs to verify each against the identifier in every record in the retrieved dataset. Which is quicker or more efficient may depend on the format of the dataset. However, in both cases a degree of caching can be used to reduce the amount of calculation required.

Thus, at the end of step 1404, all the records in the retrieved dataset have been discovered that have an identifier that has been verified against an encrypted identifier, and the encrypted identifier has been added to the dataset. Thus, when the dataset is returned to cloud server 203, collation of datasets can take place without the data providers revealing the actual identifiers.

FIG. 16

Figure 16:
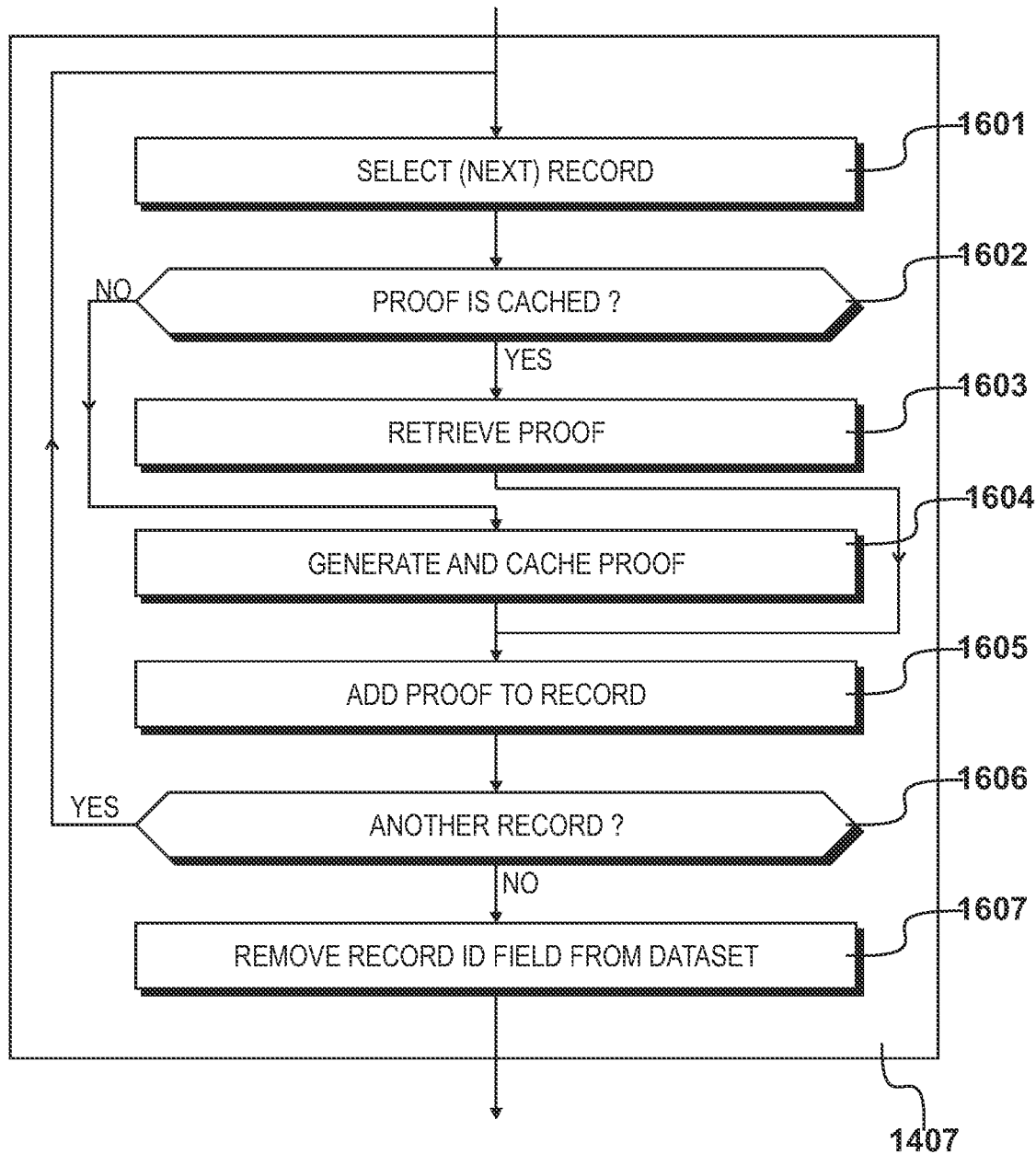
FIG. 16 details steps carried out during FIG. 14 to add proofs to a dataset.

FIG. 16 details step 1407 at which local proofs are added to the dataset if necessary. This occurs if there are any records in the dataset that have not been verified against a received proof, and if these records are required to be returned.

At step 1601 the first record in the retrieved dataset is selected, and at step 1602 a question is asked as to whether a proof for this record has been cached. As will be described further with reference to FIG. 17, the proof for a particular identifier is always the same for a particular shared key. This allows for proofs to be cached, or generated in advance, and an efficient caching strategy will be determined by how often the shared key is regenerated and how often the additional variable is changed. The shared key and the additional variable are used for the encryption process, and therefore the encrypted identifiers will be different every time one of them is changed. The shared key may be regenerated on every iteration of step 1006, in which case caching would be unnecessary.

If the question asked at step 1602 is answered in the affirmative, to the effect that the proof is cached, then at step 1603 the proof is retrieved. Alternatively, the proof is generated and cached if required at step 1604. In either case, the proof is added to the record at step 1605.

At step 1606 a question is asked as to whether there is another record in the dataset that requires a local proof (i.e., one that has not been verified against a received proof), and if this question is answered in the affirmative control is returned to step 1601 and the next record is selected. Alternatively, the question is answered in the negative and all records that need a proof have had one retrieved or generated.

Thus, at this point, all the records in the retrieved dataset have a proof. At step 1607 the identifier field is now removed from the dataset in order that it can be returned to cloud server 203 after any further personal identifying data has been removed at step 1407.

Figure 17:
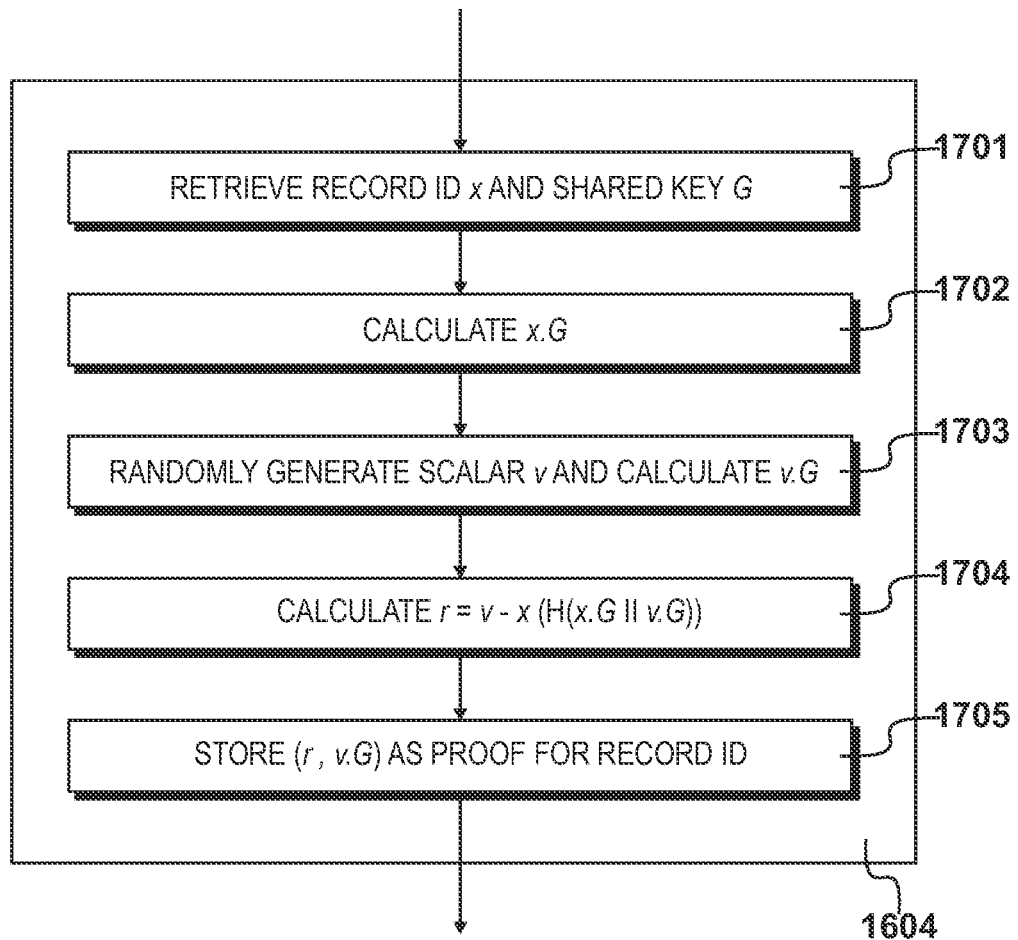
FIG. 17 details steps carried out during FIG. 16 to generate a proof.
Figure 18:
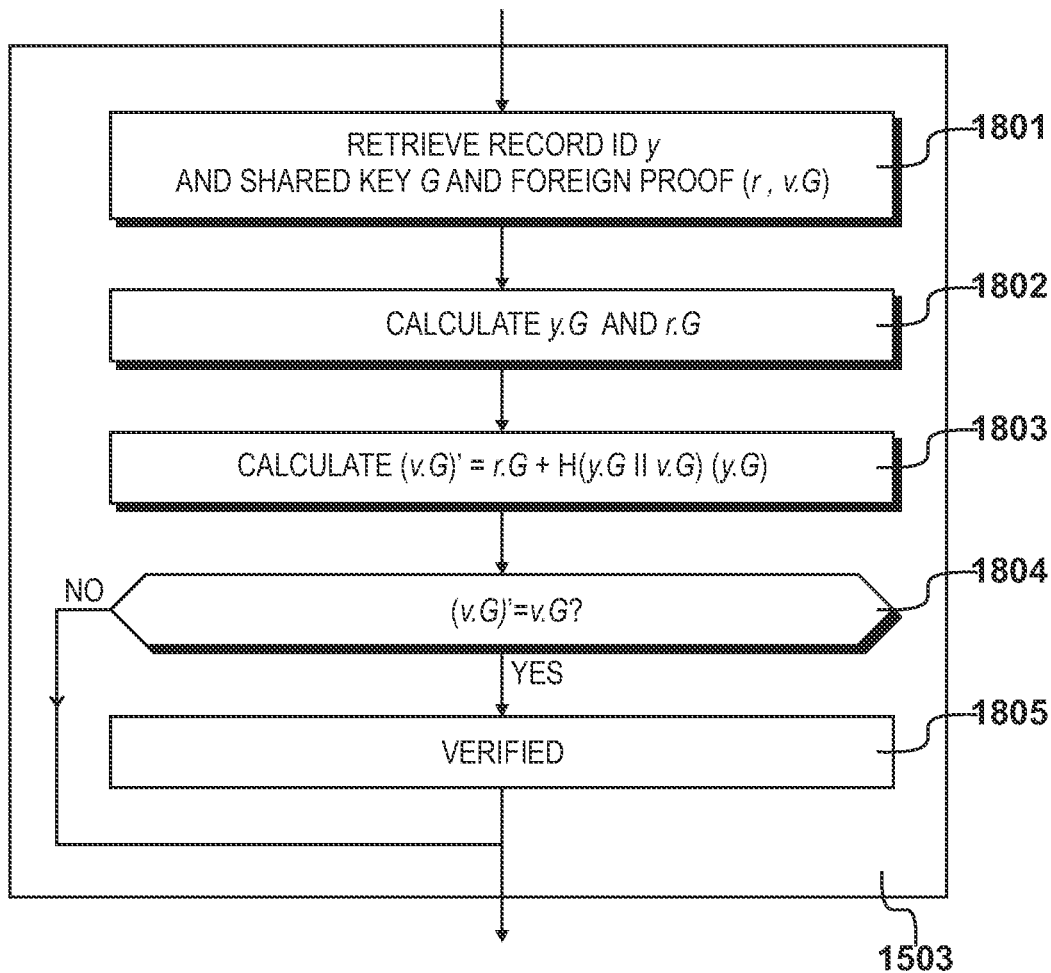
FIG. 18 details steps carried out during FIG. 15 to verify a proof.

FIGS. 17 and 18

The specific non-interactive zero-knowledge protocol implemented in this embodiment will now be described with reference to FIGS. 17 and 18. This protocol has been selected as one that is most suitable for this embodiment. However, other zero-knowledge protocols could be used. In addition, other suitable encryption methods could be used, in which a first party encrypts an identifier using a shared key, and a second party verifies the encrypted identifier against another, unencrypted, identifier, where the parties do not communicate save through a coordinating party. The second party should not be able to decrypt the encrypted identifier, and to achieve this the first party may use an additional variable, known only to itself, in the encryption process.

The protocol used in this embodiment is a Schnorr zero-knowledge proof protocol, made non-interactive by a Fiat-Shamir modification, using elliptic curve cryptography. In a typical interactive Schnorr protocol, a secret and a first random number are combined in some way by a first party and sent to a second party. The second party picks a second random number and returns it to the first party. The first party computes a number based on the two random numbers and the secret, and returns this number to the second party. The other party can check this computed number against a number it computes, and if they are the same, it confirms that the first party knows the secret. However, this interactive protocol requires communication between the parties. In the environment described herein, this would allow two connect servers to verify that they each hold data relating to a particular identifier, but would not generate an encrypted identifier that could be used by the cloud server to collate data. For a single identifier, each iteration of the protocol between different pairs of connect servers would generate a different proof.

Thus in this embodiment of the invention the interactive protocol is made non-interactive by the replacement of the second party's random number with a hash generated by the first party. This allows the first party to generate a proof for each identifier, which can be independently verified by each of the other connect servers and used to collate the datasets. A further modification is made by using a shared key to generate and verify the proof, as this prevents any party that does not know the shared key from verifying the proof.

In other embodiments a different non-interactive zero-knowledge proof protocol could be used, or another method of encrypting identifiers using a shared encryption key and possibly an additional variable known only to the first party.

In this embodiment the protocol uses elliptic curve cryptography. The connect servers 104 to 107 are pre-provided with an elliptic curve, which could be periodically updated, and the shared key is a point on that elliptic curve, generated by and known only to the connect servers. The algorithm uses elliptic curve scalar multiplication (also referred to as elliptic curve point multiplication), which is the operation of successively adding a point along an elliptic curve to itself repeatedly. This is a one-way function, as if the point is known then reversing the function is computationally intractable if the scalar is large enough.

Any method of generating a shared encryption key can be used, as long as the shared key is known across all connect servers 104 to 107, but cannot be known by any other device including cloud server 203.

FIG. 17 details step 1604, at which a local proof is generated and cached by a connect server. To generate a proof of an identifier in a record, the process retrieves, at step 1701, the shared key G, being a point on an elliptic curve, and the identifier x in the selected record. As previously described, if the identifier includes non-numerical characters, it may be necessary to encode it to generate a unique numerical identifier for the purposes of the protocol. In this case, it is likely that such a step would be carried out in the background such that each record included an encoded identifier, and this would be the retrieved identifier x, rather than retrieving a non-numerical identifier and encoding it on every iteration.

At step 1702 the scalar multiple of the identifier x and the shared key is calculated to generate a first point $x \cdot G$. At step 1703 a large random scalar v is generated, which is the additional variable of this embodiment. The scalar multiple of v and the shared key G is calculated to generate a second point $v \cdot G$, which forms a part of the proof.

At step 1704 a number r is calculated, which forms the other part of the proof. First, a hash c of the concatenation of the two points is generated using a hash function H. In this embodiment the hash function SHA-256 is used, although any other suitable hash function can be used. The concatenation of the two points can be replaced by any other method of combining them, such as summing. The number r is obtained by multiplying the identifier x by the hash c, and subtracting the result from the random scalar v. The calculation at step 1704 is therefore as follows, where a dot indicates an elliptic curve scalar multiplication:

$$c=H(x \cdot G \| v \cdot G)$$

$$r=v-xc$$

The proof consists of the values of r and $v \cdot G$, and at step 1705 this is stored in memory, and cached if required.

Because v is chosen to be large, $v \cdot G$ is a one-way function that cannot be reversed to discover v. Similarly, the hash function is one-way and so r cannot be reversed. It therefore does not matter if x is not large, since $x \cdot G$ is not included in the proof.

Therefore, a second connect server in possession of the shared key G and receiving a proof (r, $v \cdot G$) cannot reverse the proof to determine the value of the encrypted identifier x. However, it can determine whether x is the same as an unencrypted identifier y in its own data source, during verification step 1503 detailed in FIG. 18.

During this step, a received proof is being verified against an identifier y in a selected record. As previously described, if the identifiers are non-numerical then an encoding step may be necessary to obtain y. Thus at step 1801 the shared key G, the identifier y and a proof (r, $v \cdot G$) are retrieved from memory. At step 1802 the scalar multiple of the identifier y and the shared key G is calculated to generate a third point $y \cdot G$, which is combined with the received proof at step 1803 as follows.

A hash c' of the concatenation (or other combination method) of $y \cdot G$ and $v \cdot G$ is calculated using the same hash function H:

$$c'=H(y \cdot G \| v \cdot G)$$

If the identifiers x and y are the same then the second and third points $x \cdot G$ and $y \cdot G$ will be the same, and so the hash c' will be identical to the hash c, leading to the following equations:

$$x=y \Rightarrow xc=yc'$$

$$\Rightarrow v-xc=v-yc'$$

$$\Rightarrow r \cdot G=v \cdot G-c'(y G)$$

Thus, at step 1804 the following is calculated:

$$(v \cdot G)'=r \cdot G+c'(y \cdot G)$$

If $v \cdot G=(v \cdot G)'$ is true then the two identifiers are identical and at step 1805 the verification process is noted as having succeeded, leading to the question asked at step 1504 being answered in the affirmative. Alternatively, if the equation at step 1804 is not true then the verification process fails, and the question at step 1504 is answered in the negative.

If the verification is successful then the connect server carrying out the verification process knows the simple fact that one of its identifiers is also used on another data source, but nothing more than that. It does not know what data source the encrypted identifier originated from, and therefore there has been no sharing of information between the connect servers. If the verification fails for every identifier in the queried dataset, then the connect server knows only that none of its identifiers matches this encrypted identifier. It is not able to decrypt the encrypted identifier and so it has gained no information at all.

In alternative embodiments, a similar algorithm could be used but with a different format of shared key. In that case, each elliptic curve scalar multiplication between a number and the shared key would be replaced with a different method of obtaining a product, such as a product of two numbers, complex numbers, sequences and so on; or multiplication, scalar multiplication, cross product, matrix product, scalar product, composition, and so on. A suitable method of calculating a product of two numbers or other mathematical entities would be selected based on the format of the shared key and the identifiers.

FIG. 19

Figure 19:
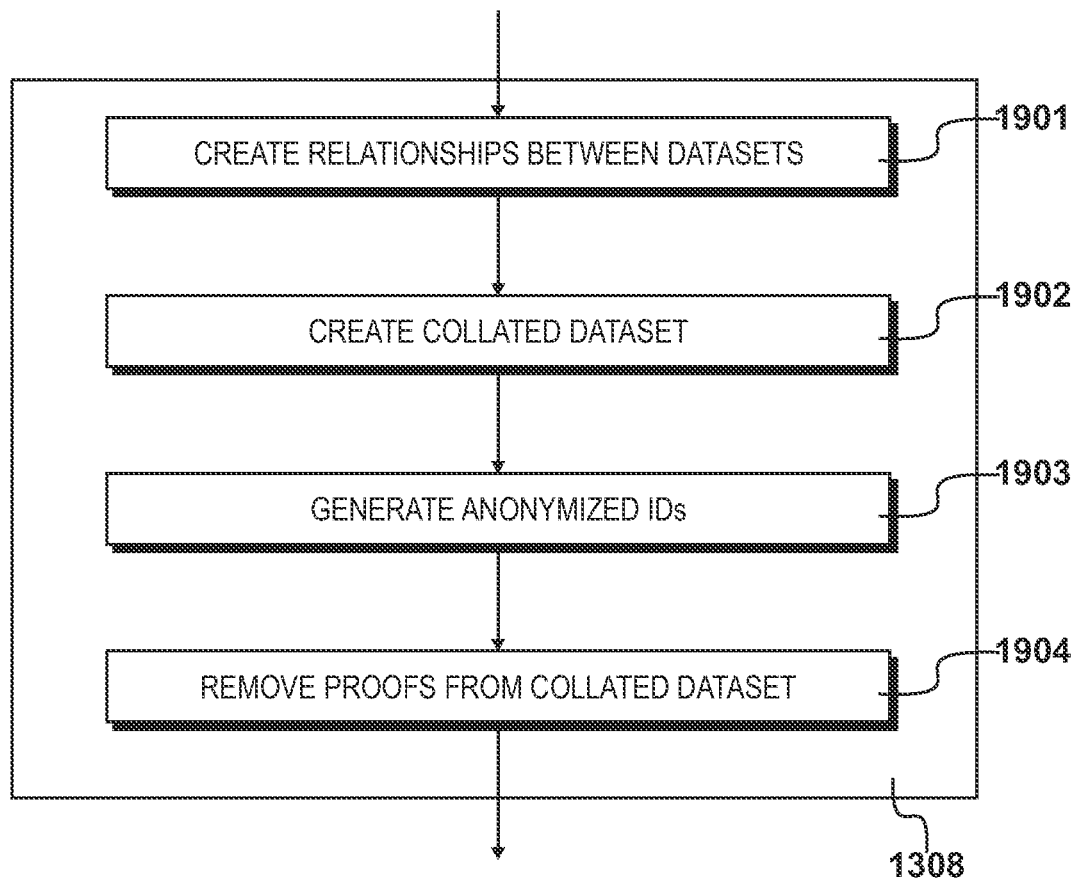
FIG. 19 details steps carried out during FIG. 13 to collate an anonymized dataset.

It has been described how cloud server 203 coordinates the obtaining of datasets from at least two connect servers, where each record in the dataset is identified by a proof. Records in the datasets identified by the same proof relate to the same personal identifier, and the datasets can therefore be collated at step 1308, detailed in FIG. 19.

The following description assumes that the datasets have been provided in a standard normalised database table format. If they are in another format, then a suitable alternative collation process should be used.

At step 1901 a single dataset is created by establishing relationships between the datasets, linking the fields that contain the proofs. At step 1902 a collated dataset is created by querying this single dataset to retrieve the required data. Alternatively, if all records are required, then the collated dataset is the single dataset.

At step 1903 each record in the collated dataset is provided with an anonymized identifier. This anonymized identifier may be generated by any suitable algorithm, such as a random number generator, a transformation of the proof, and so on. The anonymized identifiers may be unique within anonymized database 202, or the collated datasets may be stored discretely so that uniqueness between datasets is not required. Further, the collated dataset may be an update of existing longitudinal data in anonymized database 202, in which case it would be linked with that data rather than being provided with fresh anonymized identifiers.

At step 1904 the proofs are removed from the collated dataset, which is now anonymized.

As an alternative, steps 1903 and 1904 may be omitted, since the proofs are already a form of anonymized identifier.

Cloud server 203 may carry out the process of requesting and collating data from the connect servers without receiving a request from request server 201. For example, if a particular dataset is frequently requested by users, cloud server 203 may be configured to automatically obtain daily updates. If the dataset being updated is longitudinal, this update would be used to automatically update anonymized data. However, if only current data is required, cloud server 203 could store each daily update in cache 304, and only move it to anonymized database 202 if it receives a request for that data from request server 201.

The invention claimed is:

1. A method of providing anonymized data, comprising the steps of, at a first server connected to a first data source:
   generating a shared encryption key;
   receiving, from a networked location, a first message comprising a first encrypted identifier that said first server is unable to decrypt;
   generating, from said first data source, a first dataset that may include data corresponding to said first encrypted identifier; and
   returning said first dataset to said networked location;
   wherein said step of generating said first dataset comprises the steps of:
      obtaining, from said first data source, a set of at least one local unencrypted identifier; and
      for each local unencrypted identifier in said set:
         using said shared encryption key, verifying said first encrypted identifier against said local unencrypted identifier to obtain either a successful or failed verification; and
         when said verification is successful, obtaining, from said first data source, first corresponding data that is associated with said local unencrypted identifier, wherein said first dataset comprises said first corresponding data;
   wherein said step of verifying said first encrypted identifier against said local unencrypted identifier comprises the steps of:
      receiving said first encrypted identifier in the form of a first number and a second number;
      calculating a product of said local unencrypted identifier and said shared encryption key to generate a third number;
      generating a first hash of a combination of said second number and said third number;
      calculating a product of said first number and said shared encryption key to generate a fourth number;
      calculating a product of said first hash and said third number and adding said product of said first hash and said third number to said fourth number to generate a fifth number; and
      checking whether said fifth number is the same as said second number and if so determining that said first encrypted identifier is verified against said local unencrypted identifier.

2. A method according to claim 1, further comprising the steps of, before said first server receives said first message: at a second server connected to a second data source:
   generating a shared encryption key that is identical to said shared encryption key generated by said first server;
   obtaining, from said second data source, a third identifier and third corresponding data that is associated with said third identifier;
   encrypting said third identifier using said shared encryption key generated by said second server to generate said first encrypted identifier;
   generating a second dataset that comprises said first encrypted identifier and said third corresponding data; and
   providing said second dataset to said networked location.

3. A method according to claim 2, wherein:
   said step of encrypting said third identifier to generate said first encrypted identifier comprises the steps of generating said first number and said second number by:
      generating a random scalar, and calculating a product of said random scalar and said shared encryption key generated by said second server to generate said second number;
      calculating a product of said third identifier and said shared encryption key generated by said second server to generate a sixth number;
      generating a second hash of a combination of said second number and said sixth number; and
      calculating said first number as: a multiple of said third identifier and said second hash, subtracted from said random scalar.

4. A method according to claim 3, wherein:
   said shared encryption key generated by said second server is a point on an elliptic curve,
   each of said numbers are points on said elliptic curve, and said product is calculated using elliptic curve scalar multiplication.

5. A method according to claim 2, further comprising the steps of, at a coordinating server:
   receiving said second dataset from said second server;

extracting said first encrypted identifier from said second dataset and sending said first message to said first server;

receiving said first dataset from said first server; and collating said first corresponding data and said third corresponding data to provide said anonymized data.

6. A method according to claim 1, wherein said step of generating said shared encryption key comprises the steps of:

at a coordinating server, providing instructions to each of said first server and a second server to generate one or more encryption keys;

at each of said first server and said second server, generating an encryption key and providing said encryption key to said coordinating server;

at said coordinating server, receiving a first encryption key from said first server and providing said first encryption key to said second server, and receiving a second encryption key from said second server and providing said second encryption key to said first server; and at each of said first server and said second server, receiving said second encryption key and said first encryption key respectively and using said second encryption key and said first encryption key respectively to generate said shared encryption key.

7. Apparatus for providing anonymized data, comprising a first server comprising a first processor connected to a first data source, and a first network interface, wherein said first processor is configured to:

generate a shared encryption key;

receive, via said first network interface, a first message comprising a first encrypted identifier that said first server is unable to decrypt;

generate, from said first data source, a first dataset that may include data corresponding to said first encrypted identifier; and return said first dataset to a networked location via said first network interface;

wherein said step of generating said first dataset comprises the steps of:

obtaining, from said first data source, a set of at least one local unencrypted identifier; and for each local unencrypted identifier in said set:

using said shared encryption key, verifying said first encrypted identifier against said local unencrypted identifier to obtain either a successful or failed verification; and when said verification is successful, obtaining, from said first data source, first corresponding data that is associated with said local unencrypted identifier, wherein said first dataset comprises said first corresponding data;

wherein said first processor is configured to verify said first encrypted identifier against said local unencrypted identifier by:

receiving said first encrypted identifier in the form of a first number and a second number;

calculating a product of said local unencrypted identifier and said shared encryption key to generate a third number;

generating a first hash of a combination of said second number and said third number;

calculating a product of said first number and said shared encryption key to generate a fourth number;

calculating a product of said first hash and said third number and adding said product of said first hash and said third number to said fourth number to generate a fifth number; and checking whether said fifth number is the same as said second number, and if so determining that said first encrypted identifier is verified against said local unencrypted identifier.

8. Apparatus for providing anonymized data according to claim 7, further comprising a second server comprising a second processor connected to a second data source, and a second network interface, wherein said second processor is configured to, before the steps carried out by said first processor:

generate a shared encryption key that is identical to said shared encryption key generated by said first server;

obtain, from said second data source, a third identifier and third corresponding data that is associated with said third identifier;

encrypt said third identifier using said shared encryption key generated by said second processor to generate said first encrypted identifier;

generate a second dataset that comprises said first encrypted identifier and said third corresponding data; and provide said second dataset to said networked location via said second network interface.

9. Apparatus according to claim 8, wherein said second processor is configured to generate a first variable that is kept secret from said first server; wherein:

said step of encrypting said third identifier is carried out using said shared encryption key generated by said second processor and said first variable.

10. Apparatus for providing anonymized data according to claim 8, further comprising a coordinating server comprising a third processor and a third network interface, wherein said third processor is configured to:

receive said second dataset from said second server, via said third network interface;

extract said first encrypted identifier from said second dataset and send said first message to said first server, via said third network interface;

receive said first dataset from said first server, via said third network interface; and collate said first corresponding data and said third corresponding data to provide said anonymized data.

11. Apparatus system according to claim 10, wherein:

said third processor is configured to provide, via said third network interface, instructions to each of said first processor and said second processor to generate one or more encryption keys;

each of said first processor and said second processor is configured to generate an encryption key and provide said encryption key, via said first network interface and said second network interface respectively, to said third processor;

said third processor is configured to, via said third network interface, receive a first encryption key from said first processor and provide said first encryption key to said second processor, and receive a second encryption key from said second processor and provide said second encryption key to said first processor; and at each of said first server and said second server, receive said second encryption key and said first encryption key respectively via said first network interface and said second network interface respectively, and use said second encryption key and said first encryption key respectively to generate said shared encryption key.

\* \* \* \* \*